US011176616B2

(12) United States Patent
Coonrod et al.

(10) Patent No.: US 11,176,616 B2
(45) Date of Patent: Nov. 16, 2021

(54) SYSTEM TO PREDICT IMPACT OF EXISTING RISK RELATIONSHIP ADJUSTMENTS

(71) Applicant: Hartford Fire Insurance Company, Hartford, CT (US)

(72) Inventors: Lane Garrison Coonrod, West Hartford, CT (US); Jeffery T. Hay, Avon, CT (US); Michael R. Gittings, Baltimore, MD (US)

(73) Assignee: Hartford Fire Insurance Company, Hartford, CT (US)

( * ) Notice: Subject to any disclaimer, the term of this patent is extended or adjusted under 35 U.S.C. 154(b) by 325 days.

(21) Appl. No.: 15/900,953

(22) Filed: Feb. 21, 2018

(65) Prior Publication Data

US 2019/0259103 A1    Aug. 22, 2019

(51) Int. Cl.
*G06Q 30/00* (2012.01)
*G06Q 40/08* (2012.01)

(52) U.S. Cl.
CPC .................................. *G06Q 40/08* (2013.01)

(58) Field of Classification Search
CPC ...................................................... G06Q 40/08
USPC ...... 705/4, 1.1, 26.1, 10, 16, 31, 36, 27, 37, 705/400; 345/589, 440
See application file for complete search history.

(56) References Cited

U.S. PATENT DOCUMENTS

| 7,133,848 | B2 | 11/2006 | Philips et al. |
| 8,010,404 | B1* | 8/2011 | Wu ..................... G06Q 30/0242 |
| | | | 705/7.29 |
| 8,725,541 | B2* | 5/2014 | Andrist .................. G06Q 40/08 |
| | | | 705/4 |
| 2010/0275263 | A1* | 10/2010 | Bennett ................. G06F 21/577 |
| | | | 726/25 |
| 2012/0296694 | A1 | 11/2012 | McGill et al. |
| 2016/0078544 | A1 | 3/2016 | Brady |
| 2017/0024827 | A1 | 1/2017 | McGill et al. |

OTHER PUBLICATIONS

ProQuestDialogNPL Search History.*

* cited by examiner

*Primary Examiner* — John H. Holly
(74) *Attorney, Agent, or Firm* — Buckley, Maschoff & Talwalkar LLC

(57) ABSTRACT

According to some embodiments, an existing risk relationship data store may contain electronic records, each electronic record including a risk relationship identifier and a risk relationship characteristic for an existing risk relationship between the enterprise and an entity. A prediction platform may receive electronic records associated with a set of existing risk relationships along with an indication of a future adjustment to a parameter associated with the set of existing risk relationships. The prediction platform may then automatically calculate a projected future impact to a key metric for the set of existing risk relationships based on the future adjustment to the parameter. A rendering platform may receive the projected future impact to the key metric and present an interactive graphical user interface, including an indication of projected future impact, to an administrator.

13 Claims, 25 Drawing Sheets

RISK RELATIONSHIP PREDICTION PLATFORM

400

PRICING INSIGHT TOOL – OVERALL RESULTS

410

SEARCH: 420

OVERALL RESULTS

| METRIC | YEAR 0 | | | YEAR 1 | | | YEAR 2 | | |
|---|---|---|---|---|---|---|---|---|---|
| | CURR | PROP | DIFF | CURR | PROP | DIFF | CURR | PROP | DIFF |
| Accepted Policy Count | 50,000 | 50,000 | 0.0% | 50,000 | 51,000 | 0.2% | 51,000 | 53,000 | .4% |
| Retained Count | 50,000 | 50,000 | 0.0% | 50,000 | 51,000 | 0.2% | 51,000 | 49,000 | -0.8% |
| Quote Count | 0 | 0 | 0.0% | 50,000 | 48,000 | -1.2% | 48,000 | 49,000 | 0.2% |
| Issued Policies | 0 | 0 | 0.0% | 0 | 0 | 0.0% | 0 | 0 | 0.0% |

| | RENEWAL CALLS 910 | NON-RENEWAL CALLS 920 | TOTAL CALLS 930 |
|---|---|---|---|
| CATEGORY 1 | 250 | 350 | 600 |
| CATEGORY 2 | 300 | 500 | 800 |
| CATEGORY 3 | 500 | 400 | 900 |
| CATEGORY 4 | 900 | 600 | 1500 |
| | 1,950 | 1,850 | 3,800 |

*FIG. 9*

SYSTEM TO PREDICT IMPACT OF EXISTING RISK RELATIONSHIP ADJUSTMENTS

FIELD

The present invention relates to computer systems and, more particularly, to computer systems associated with predicting impacts of existing risk relationship adjustments.

BACKGROUND

An enterprise may enter into risk relationships with entities. For example, an insurance company may issue insurance policies to insured to help protect them from unexpected occurrences. Such an enterprise may enter into different types of risk relationships with different types of entities. Moreover, various types of relationships and entities may be associated with different risk characteristics that can vary over time. As a result, it can be difficult for an enterprise to predict future values associated with these characteristics. In some cases, an enterprise might take ad hoc analysis approach to manually test out different scenarios. This technique, however, can be a difficult and error prone process, making it hard to understand inherent trade-offs and/or expected impacts to key performance indicators that may result from even minor modifications.

As a result, improved ways to facilitate prediction of future key metric changes for risk relationships may be desired.

SUMMARY

According to some embodiments, systems, methods, apparatus, computer program code and means may facilitate prediction of future key metric changes for risk relationships. In some embodiments, existing risk relationship data store may contain electronic records, each electronic record including a risk relationship identifier and a risk relationship characteristic for an existing risk relationship between an enterprise and an entity. A prediction platform may receive electronic records associated with a set of existing risk relationships along with an indication of a future adjustment to a parameter associated with the set of existing risk relationships. The prediction platform may then automatically calculate a projected future impact to a key metric for the set of existing risk relationships based on the future adjustment to the parameter. A rendering platform may receive the projected future impact to the key metric and present an interactive graphical user interface, including an indication of projected future impact, to an administrator.

Some embodiments comprise: means for receiving, at a prediction platform from an existing risk relationship data store, electronic records, each electronic record including a risk relationship identifier and a risk relationship characteristic for an existing risk relationship between the enterprise and an entity; means for receiving an indication of a future adjustment to a parameter associated with the set of existing risk relationships; means for automatically calculating a projected future impact to a key metric for the set of existing risk relationships based on the future adjustment to the parameter; and means for presenting, by a rendering platform, an interactive graphical user interface, including an indication of projected future impact, to an administrator.

A technical effect of some embodiments of the invention is an improved, secure, and computerized method to facilitate prediction of future key metric changes for risk relationships. With these and other advantages and features that will become hereinafter apparent, a more complete understanding of the nature of the invention can be obtained by referring to the following detailed description and to the drawings appended hereto.

BRIEF DESCRIPTION OF THE DRAWINGS

FIG. 4 is pricing insight tool overall results display in accordance with some embodiments.

FIG. 9 provides a tabular presentation of increased telephone call counts according to some embodiments.

DETAILED DESCRIPTION

The present invention provides significant technical improvements to facilitate prediction of future key metric changes for risk relationships, predictive risk-related data modeling, and dynamic data processing. The present invention is directed to more than merely a computer implementation of a routine or conventional activity previously known in the industry as it significantly advances the technical efficiency, access and/or accuracy of communications between devices by implementing a specific new method and system as defined herein. The present invention is a specific advancement in the areas of risk-related predictions and/or processing by providing benefits in data accuracy, data availability, and data integrity, and such advances are not merely a longstanding commercial practice. The present invention provides improvement beyond a mere generic computer implementation as it involves the processing and conversion of significant amounts of data in a new beneficial manner as well as the interaction of a variety of specialized client and/or third-party systems, networks and subsystems. For example, in the present invention information may be processed, forecast, and/or predicted via an analytics engine and results may then be analyzed efficiently to allocate resources as appropriate, thus improving the overall performance of an enterprise system, including message storage requirements and/or bandwidth considerations (e.g., by predicting an increased number of messages that will be received via a network). Moreover, embodiments associated with predictive models might further improve predictions of retention rates, resource allocation decisions, etc.

Figure 1:
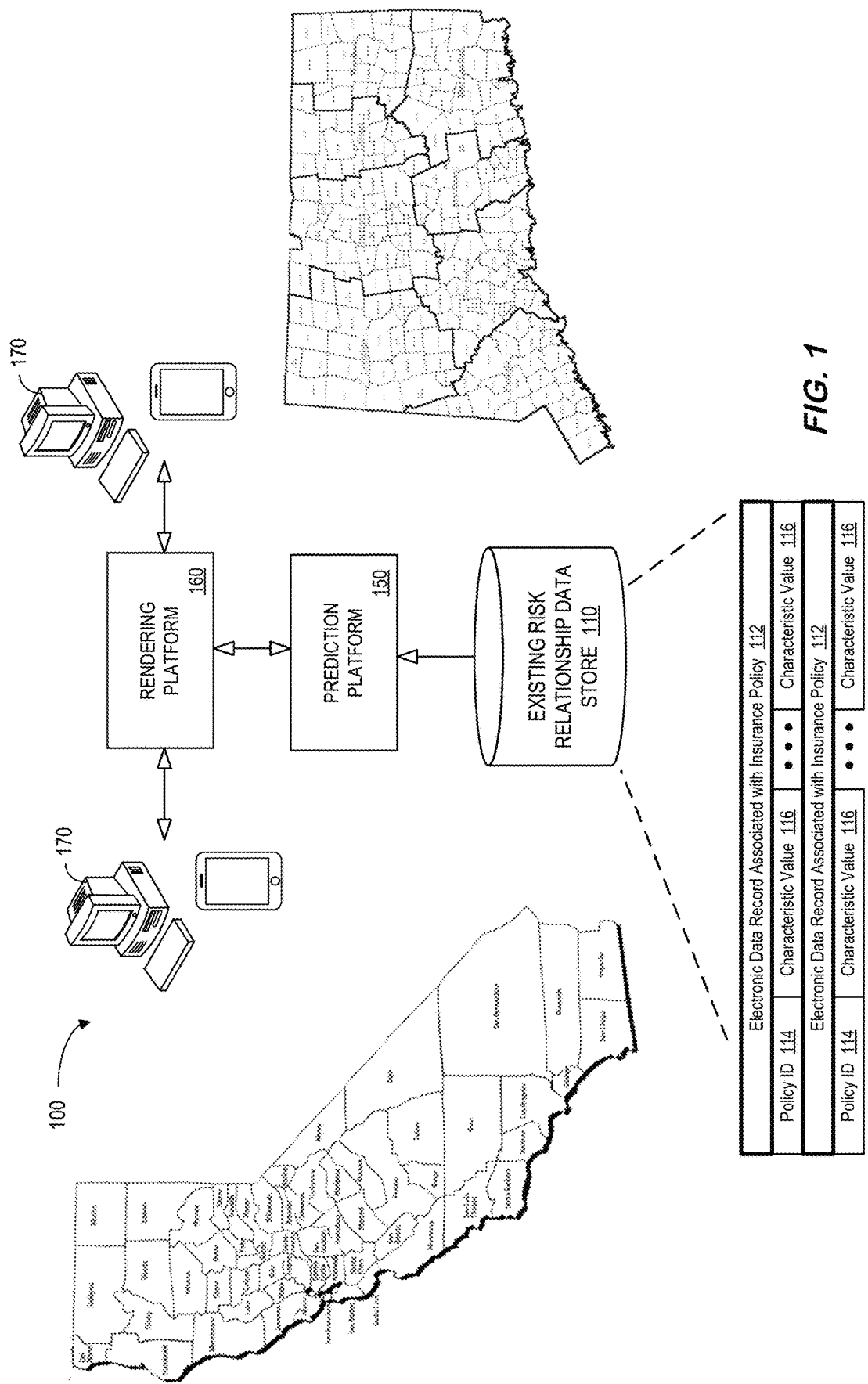
FIG. 1 is block diagram of a system according to some embodiments of the present invention.

An enterprise, such as an insurance company, may want to establish a set of expectations when considering a change to a parameter associated with existing risk relationships. For example, what effect will a premium adjustment have on policy renewal rates, telephone call volumes, etc. To help determine this type of information, improved ways to facilitate prediction of future key metric changes for risk relationships may be desired. FIG. 1 is block diagram of a system 100 according to some embodiments of the present invention. The system 100 includes a prediction platform 150 that may receive information from an existing risk relationship data store 110, third-party devices (e.g., economic models, competitor rates, business trends, etc.), and/or other sources.

According to some embodiments, the prediction platform 150 exchanges data with administrator device 170 via a rendering platform 160 and/or a communication network. For example, a Graphical User Interface ("GUI") or other module of the prediction platform 150 might transmit information via the Internet to facilitate a rendering of an interactive graphical operator interface display and/or the creation of electronic messages, automatically created call center recommendations, etc. According to some embodiments, the prediction platform 150 may instead store this information in a local database.

The prediction platform 150 may receive a request for a display from an administrator device 170. For example, a manager might use his or her smartphone to submit a request to the prediction platform 150. Responsive to the request, the prediction platform 150 might access information from the existing risk relationship data store 110 (e.g., associated with a set of insurance policies). The prediction platform 150 may then use the GUI to render administrator displays. According to some embodiments, an administrator may access risk relationship information through a validation process that may include a user identifier, password, biometric information, device identifiers, geographic authentication processes, etc. The existing risk relationship data store 110 might, in some embodiments, store electronic data records associated insurance policies 112, including a policy identifier 114 and characteristic values 116 (e.g., premiums, issue dates, etc.).

The prediction platform 150 might be, for example, associated with a Personal Computer ("PC"), laptop computer, smartphone, an enterprise server, a server farm, and/or a database or similar storage devices. The prediction platform 150 may, according to some embodiments, be associated with an insurance provider. One function of the prediction platform 150 may be to automatically calculate projected future impacts to a key metric associated with a set of risk relationships. According to some embodiments, the projected future impacts may be determined in connection with geographic location (e.g., on a state-by-state basis as illustrated in FIG. 1).

According to some embodiments, an "automated" prediction platform 150 may facilitate the provision of tabular and graph-based displays to an administrator. For example, the prediction platform 150 may automatically generate and transmit a graph reflecting predicted telephone call center volume following a premium change. As used herein, the term "automated" may refer to, for example, actions that can be performed with little (or no) intervention by a human.

As used herein, devices, including those associated with the prediction platform 150 and any other device described herein may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The prediction platform 150 may store information into and/or retrieve information from the existing risk relationship data store 110. The existing risk relationship data store 110 might be associated with, for example, an insurance company's insurance policy database. The existing risk relationship data store 110 may be locally stored or reside remote from the prediction platform. As will be described further below, the existing risk relationship data store 110 may be used by the prediction platform to generate pricing insights. Note that in some embodiments, a third-party information service may communicate directly with the prediction platform 150. According to some embodiments, the prediction platform 150 communicates information associated with pricing insights to a remote administrator and/or to an automated system, such as by transmitting an electronic file to an insurance enterprise device, an insurance platform, an email server, a workflow management system, a predictive model, a map application, etc.

Although a single prediction platform 150 is shown in FIG. 1, any number of such devices may be included. Moreover, various devices described herein might be combined according to embodiments of the present invention. For example, in some embodiments, the prediction platform 150 and rendering platform 160 might be co-located and/or may comprise a single apparatus.

The elements of the system 100 may provide a utility for product and/or pricing that may be used to tweak class plan factors and view the projected impact on key metrics (e.g., at the state, county, or ZIP code level). Such an ability may enhance a decision making process with respect to insurance rate changes. Moreover, an enterprise may publish or otherwise store the automatically calculated expectations, such as the expected impacts associated with a rate change (and those expectations may be consistently monitored). For example, information about inaccurate predictions might be fed back into the prediction platform to improve future projections.

Figure 2:
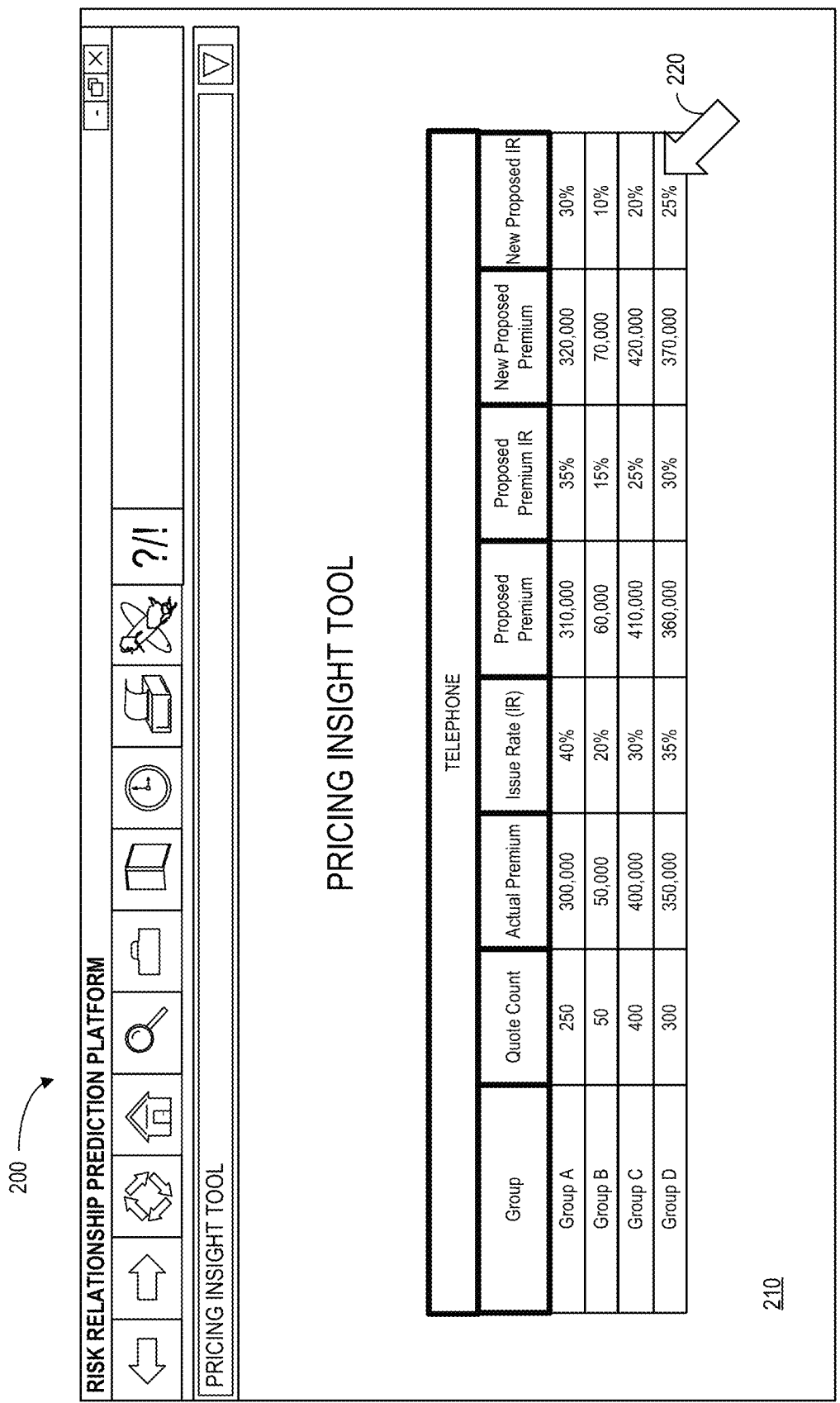
FIG. 2 is an interactive graphical pricing insight user interface in accordance with some embodiments.

FIG. 2 is an interactive graphical pricing insight user interface 200 in accordance with some embodiments. According to some embodiments, the interface 200 is associated with a spreadsheet computer application retention model and includes a display area 210 having a series of tables associated with telephone values, internet values, etc.

The tables might display, for a variety of risk relationship categories, a quote count, an actual premium, an issue rate, a proposed premium, a proposed premium issue rate, a new proposed premium, a new proposed premium issue rate, etc. In this way, an administrator such as a manager can view the potential impact proposed adjustments to a parameter associated with a risk relationship (e.g., a proposed insurance premium increase might be expected to reduce an associated issue rate). According to some embodiments, selection of an element of the display area 210 via a touchscreen or computer mouse pointer 220 results in the display of additional information about that element (e.g., a pop-up window) and/or an ability to change or adjust values associated with that element.

Figure 3:
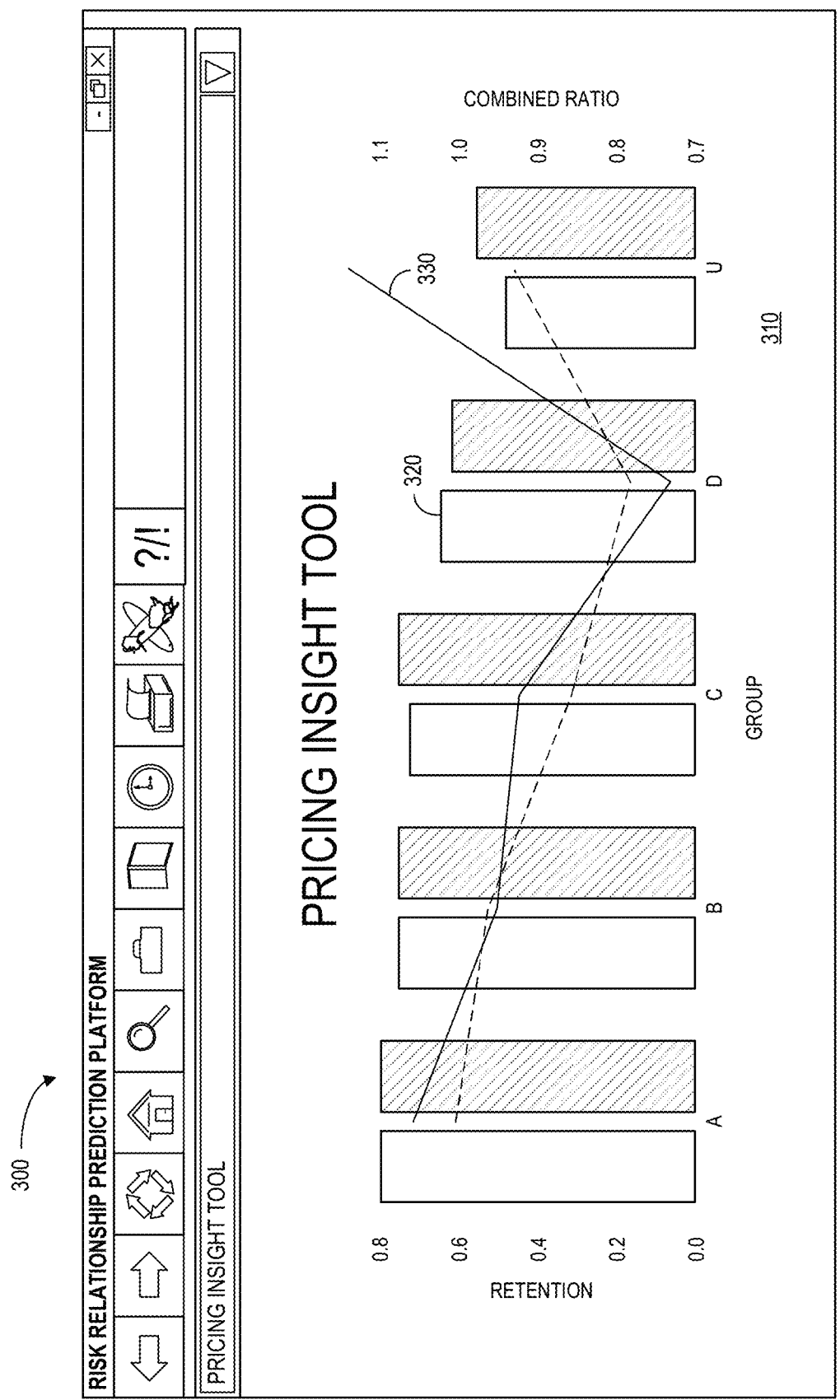
FIG. 3 is pricing insight tool display according to some embodiments.

Instead of a spreadsheet application, some embodiments might be implemented via a web-based tool. For example, FIG. 3 is a pricing insight tool display 300 according to some embodiments. The display 300 includes, for a number of different groups (e.g., market segments), a bar chart 320 showing retention values for a particular year (including, as illustrated in FIG. 3, values for a current parameter illustrated with a white bar and a proposed parameter illustrated with cross-hatched bar). The display 300 also includes, for each group, lines 330 that show combined ratio values for a particular year (including, as illustrated in FIG. 3, values for a current parameter illustrated with a dashed line and a proposed parameter illustrated with a solid line). Such a web-based tool might, according to some embodiments, be implemented using a package to build interactive web applications (e.g., R Shiny might be used to host standalone applications on a webpage or embed them in R, markdown documents, build dashboards, implement CSS themes, html widgets, JavaScript actions, etc.), support multiple simultaneous users, and/or output information to database tables forming a basis for future monitoring).

FIG. 4 is pricing insight tool overall results display 400 in accordance with some embodiments. The display 400 may include multi-year results 410 (e.g., associated with years 0 through 2) for current and proposed key performance metric values (along with a percentage difference between those values). Example of metric values might include: accepted policy count, retained count, retained premium, quote count, issued policies, average quoted premium, average issued premium, new business retention, renewal retention, rated premium year-over-year, offered premium change, total earned premium, etc. Such a display might let an administrator compare net present values associated with various potential scenarios to improve a decision-making process. For example, the information might help the administrator search for information via text box 420 to better understand tradeoffs associated with sandbox items (e.g., AQD, member discount, capping, territory pricing, etc.). The display 400 might be used to build a case for governance proposals based on best available data (e.g., setting market segment pricing based on rerated premium). According to some embodiments, the display 400 can also be used to develop and record key performance indicator projections for each state (e.g., issue rate, retention, average premiums, loss ratio, etc.) and/or to record projections in a database that can be queried by administrators and finance manages to aid in planning and monitoring. As a result, actual performance comparisons to the database may create consistency between scenario forecasts and analysis after the fact.

Figure 5:
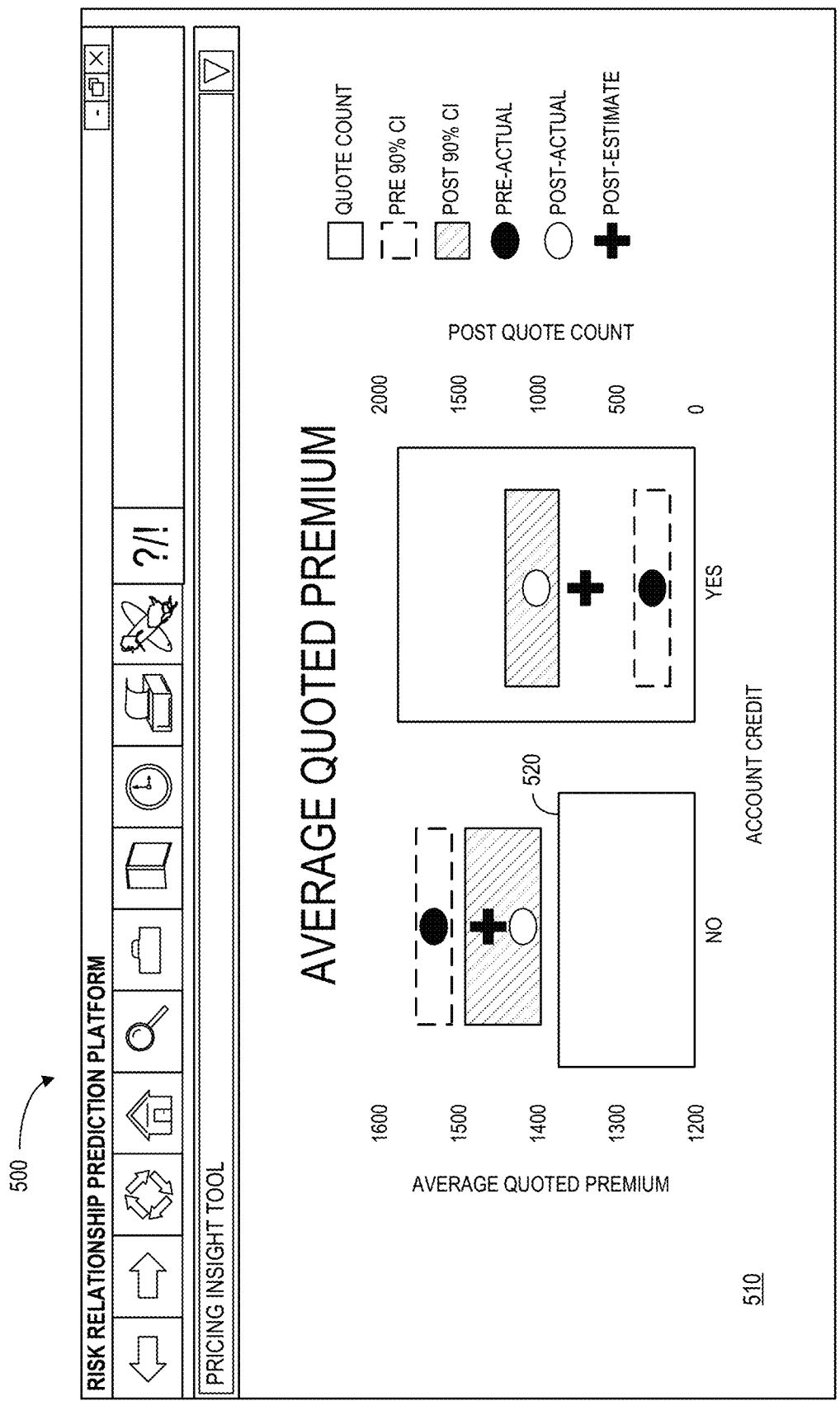
FIG. 5 is pricing insight tool average quoted premium display according to some embodiments.
Figure 6:
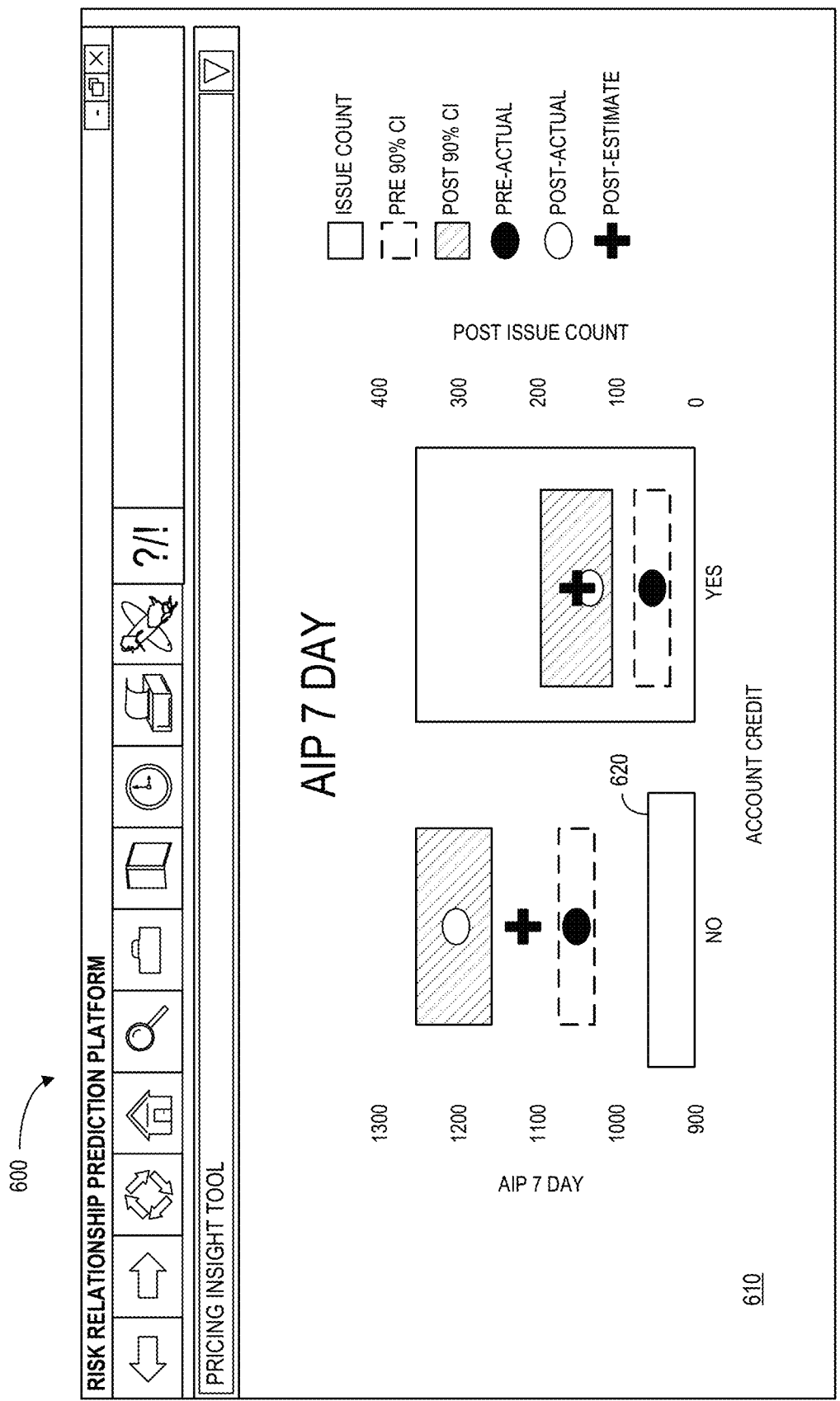
FIG. 6 is pricing insight tool actual issued premium display in accordance with some embodiments.
Figure 7:
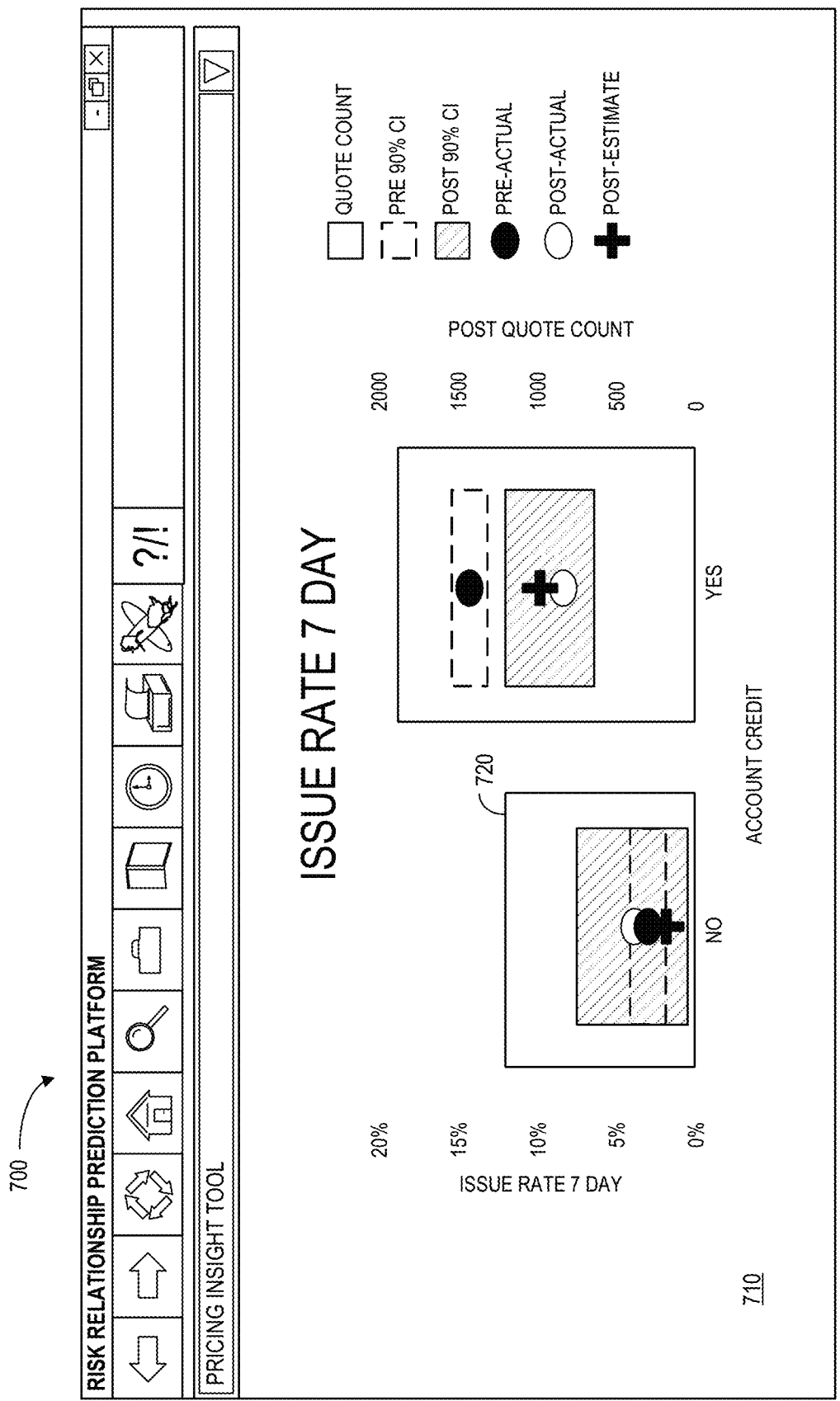
FIG. 7 is pricing insight tool issue rate display according to some embodiments.

FIG. 5 is pricing insight tool Average Quoted Premium ("AQP") display 500 according to some embodiments. The display 500 includes a direct performance chart 510 that graphically displays quote counts 520 for account credits associated with "N" and "Y." For each type of account credit, the chart 510 includes areas indicating pre-90% CI (illustrated with a dashed line) and post 90% CI (illustrated with cross-hatching). Moreover, the chart 510 includes icons indicating pre-actual, post-actual, and post-estimate values. FIG. 6 is pricing insight tool Average Issued Premium ("AIP") seven-day display 600 according to some embodiments. The display 600 includes a direct performance chart 610 that graphically displays issue counts 620 for account credits associated with "N" and "Y." For each type of account credit, the chart 610 includes areas indicating pre-90% CI (illustrated with a dashed line) and post 90% CI (illustrated with cross-hatching). Moreover, the chart 510 includes icons indicating pre-actual, post-actual, and post-estimate values. FIG. 7 is pricing insight tool Issue Rate ("IR") display 700 according to some embodiments. The display 700 includes a direct performance chart 710 that graphically displays quote counts 720 for account credits associated with "N" and "Y." For each type of account credit, the chart 710 includes areas indicating pre-90% CI (illustrated with a dashed line) and post 90% CI (illustrated with cross-hatching). Moreover, the chart 710 includes icons indicating pre-actual, post-actual, and post-estimate values. Such displays 500, 600, 700 might be used, for example, to see if AQP, AIP, and IR flatten across account and mono-line scenarios. Note that post IR is within expectations, but AQP for account business is close to the borderline. The AIP expectation for mono-line is outside 90%-CI, perhaps an anomaly resulting from the relatively low volume.

Figure 8:
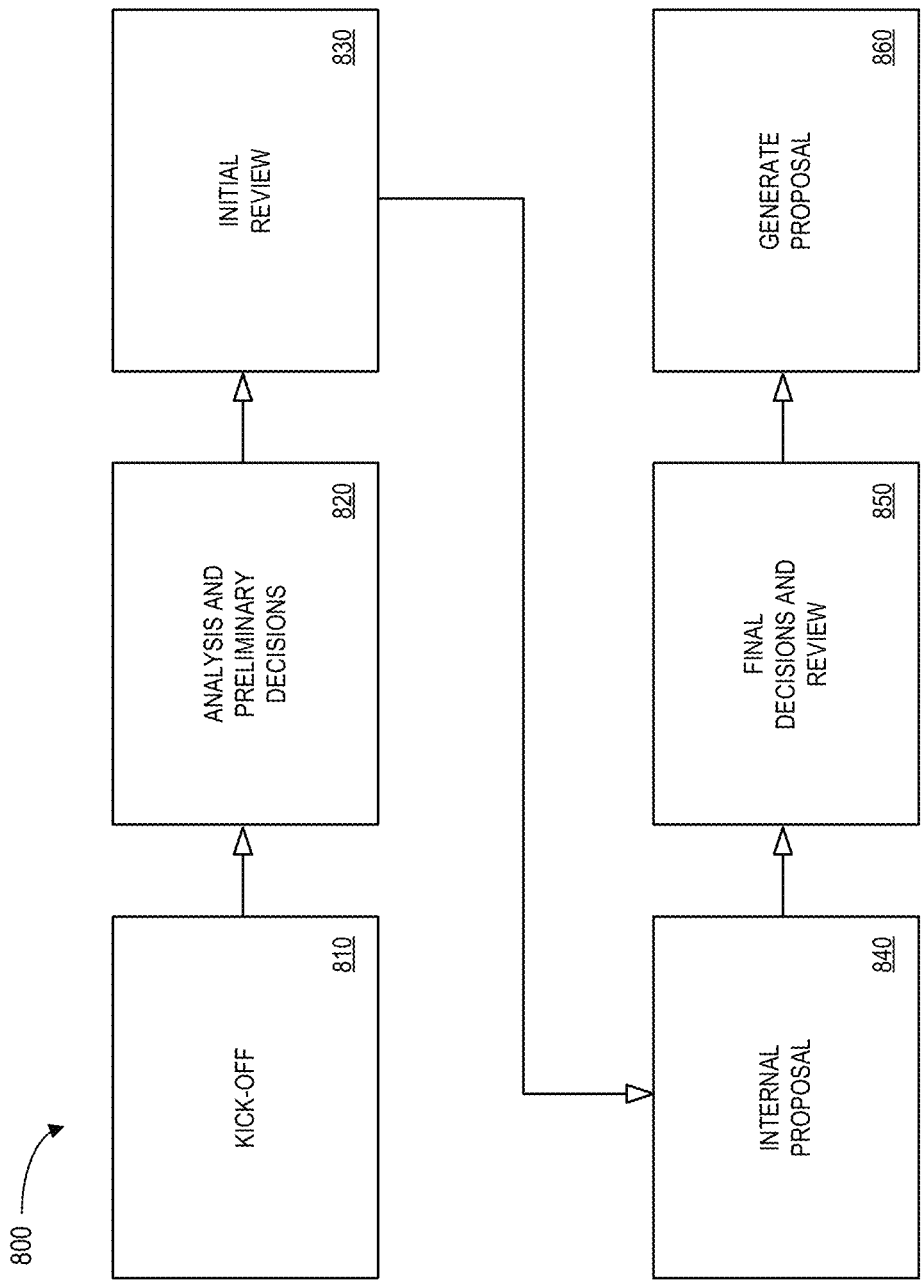
FIG. 8 is an overview of a rate review process in accordance with some embodiments.

FIG. 8 is an overview of a rate review process 800 in accordance with some embodiments. The process 800 may use in-force ratemaking and quote validation to achieve rate review. A kick-off step 810 may establish the scope, timeline, dates, and items that will be reviewed. The kick-off step 810 may be associated with both the overall rate (e.g., indications, trends LDF, ROE) and segmentation (e.g., CW changes, desktop with ratemaking to give approximate results such as potential differences due to multiplicative adjustment factors and complexities of capping, etc.). An analysis and preliminary decisions step 820 may be associated with trend, indication, and competitive position. The analysis and preliminary decisions step 820 may also include a preliminary territory and segmentation review, an initial review of potential governance, an overall rate change, and internal proposal materials.

An initial review step 830 may then be performed by regional leaders to validate the overall reasonability of proposed selections and the rate change scope to be used during an internal proposal step 840 (e.g., to present rate and class plan changes). Note that the internal proposal step might be associated with calculations (e.g., base rates, off-balance, capping, and dislocation) and expectations. According to some embodiments, a final decision and review step 850 might generate an output for review in connection with expectation setting. The final decision and review 850 may examine dislocation, capping, territory and segmentation decision, etc. to generate a final proposal 860 to present a rate change and details about how it will be implemented.

Some pricing insight tool embodiments described herein might be associated with insurance renewal telephone call predictions. For example, FIG. 9 provides a tabular presentation 900 of increased telephone call counts according to some embodiments. Consider, an MVR rate increase that an administrator might expect to cause "everyone will call in." Applied models that predict call volume for MVR rate increase to tenured customers may provide a relatively narrow range for estimated calls, allowing for better decision-making criteria. In particular, for various categories of insurance policies (e.g., CATEGORY 1 and CATEGORY 2), the model might predict a number of renewal telephone calls 910, a number of non-renewal telephone calls 920, and an overall total number of telephone calls 930.

Figure 10:
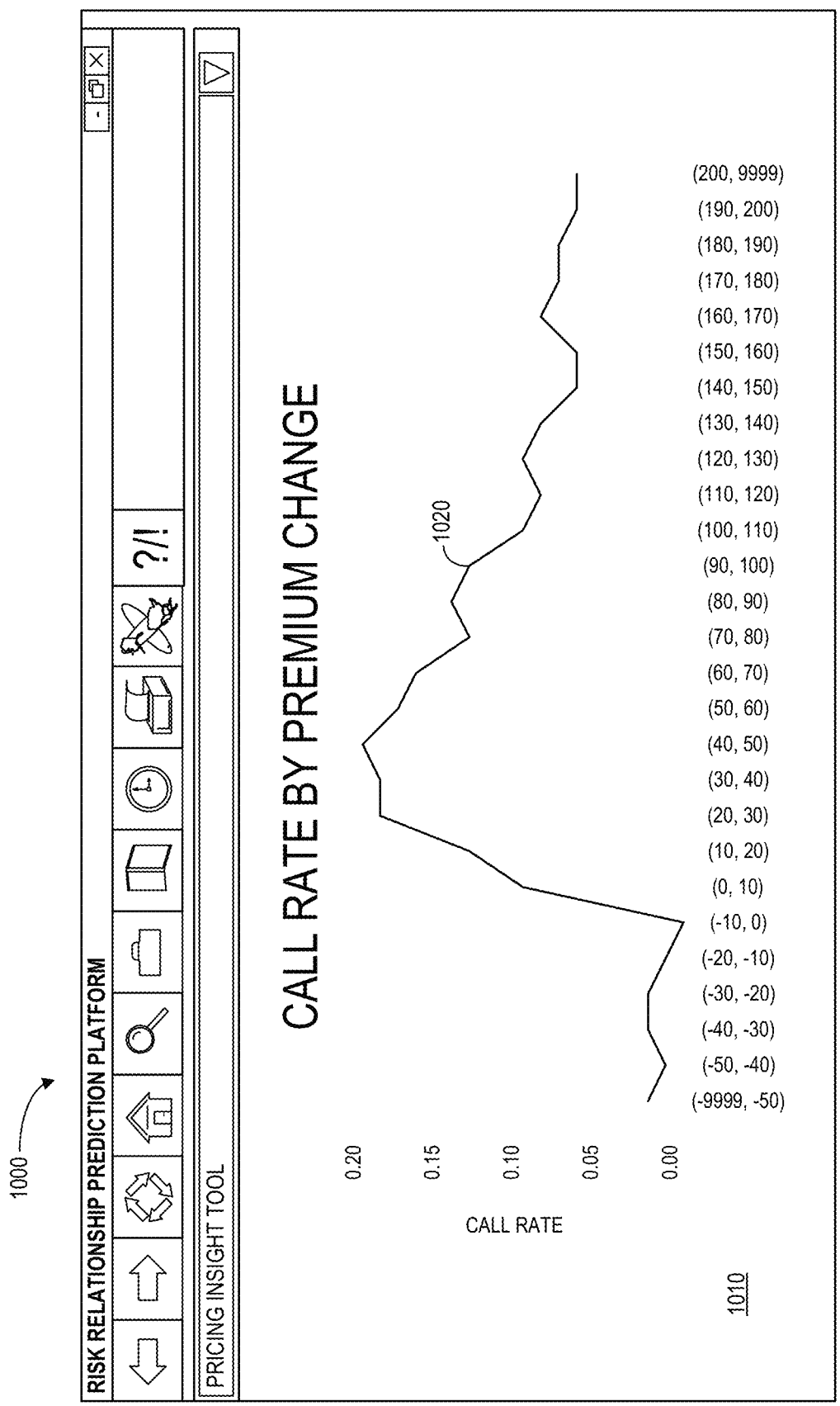
FIGS. 10 through 13 are telephone call rate displays associated with a range of premium changes in accordance with some embodiments.
Figure 11:
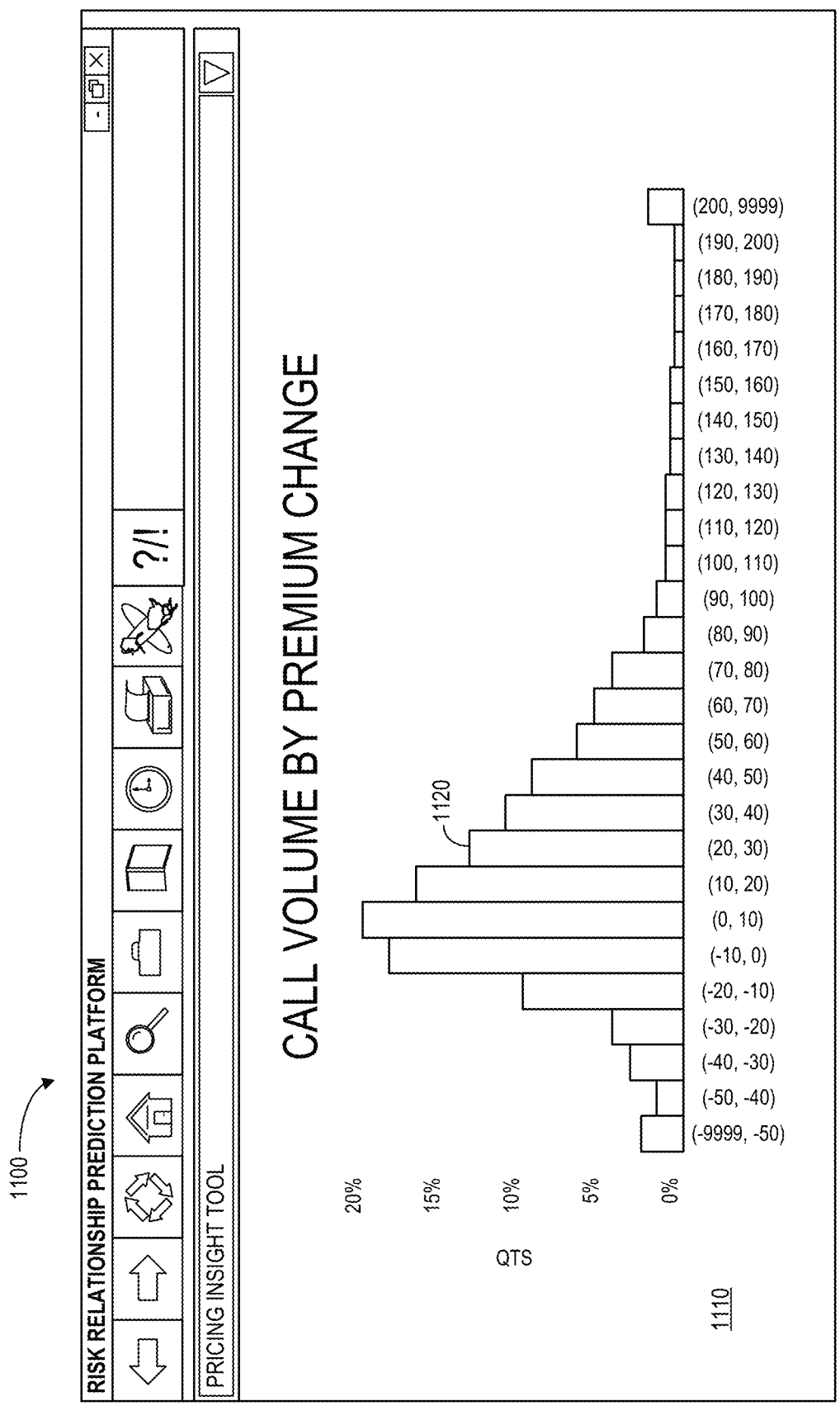
Figure 12:
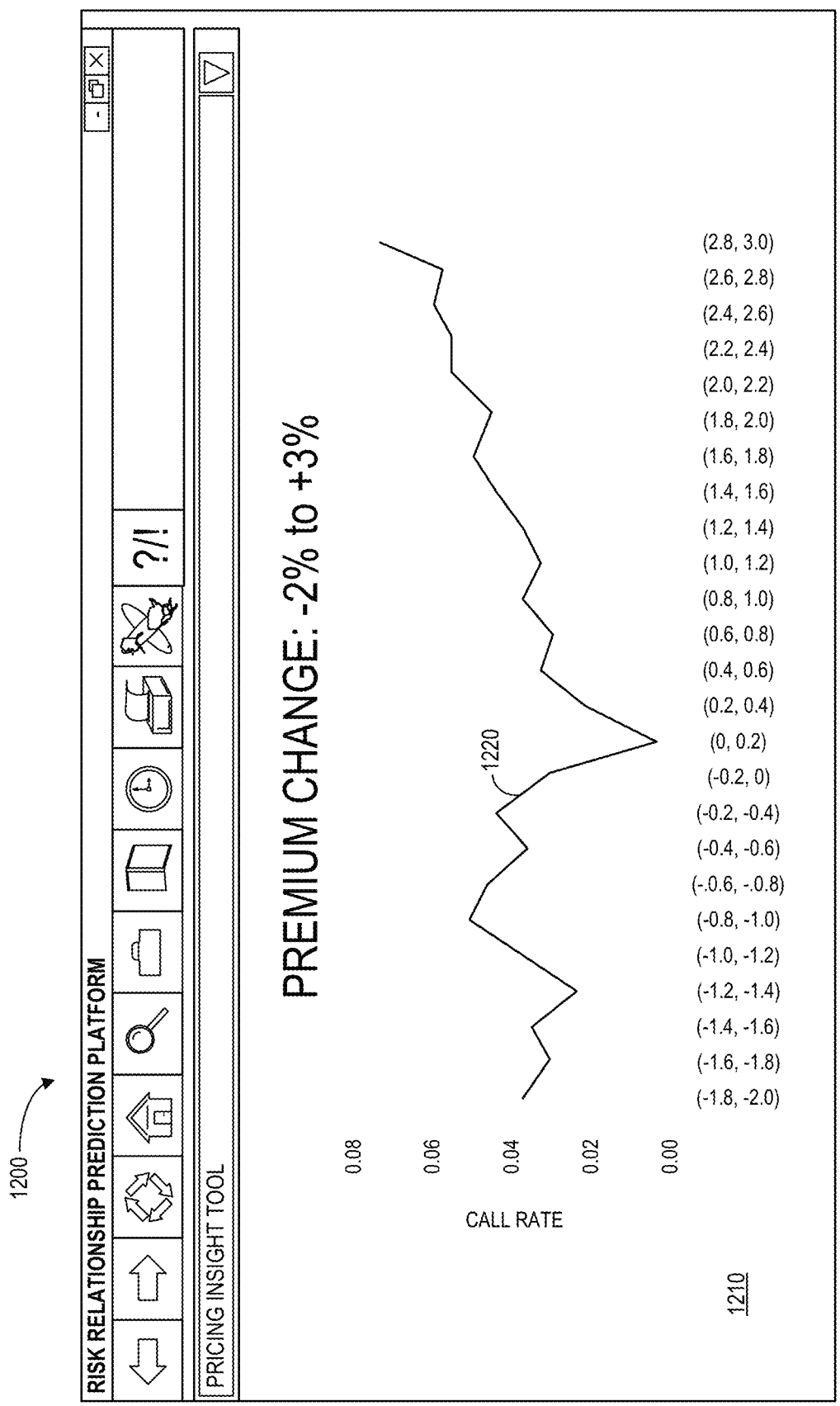
Figure 13:
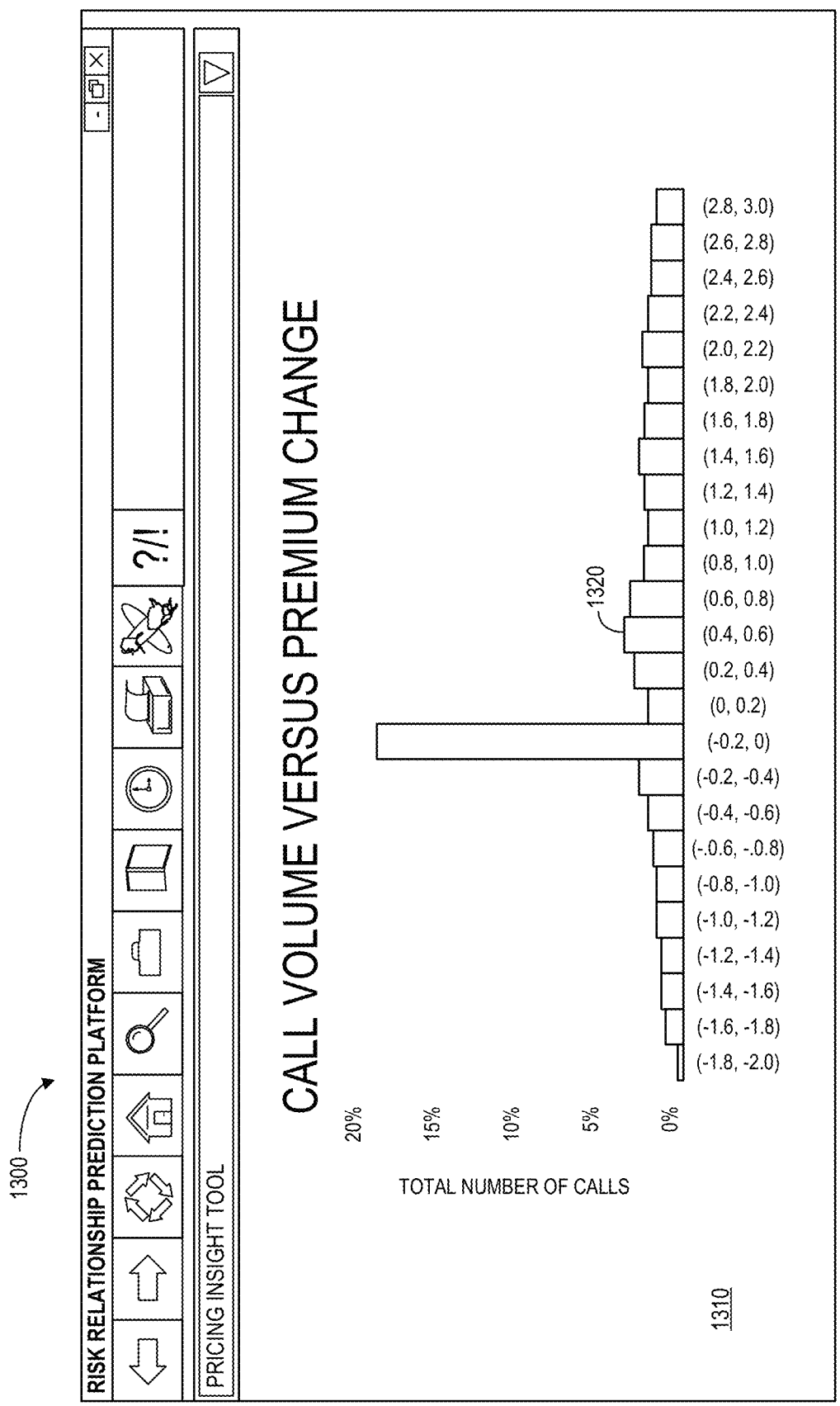

FIGS. 10 through 13 are telephone call rate displays associated with a range of premium changes in accordance with some embodiments. In particular, FIG. 10 is a display 1000 including a call rate by premium change chart 1010 with a line 1020 showing the impact of various premium changes (the x-axis) on a telephone center call rate (the y-axis). Note that the call rate peaks at around 40%. FIG. 11 is a display 1100 including call volume by premium change chart 1110 with bars 1120 showing the impact of various premium changes (the x-axis) on call volume (the y-axis). Note that the call volume peaks at around 5%. FIG. 12 is a display 1200 including a call rate by premium percentage change chart 1210 with a line 1220 showing the impact of various premium change percentages (the x-axis) on a telephone center call rate (the y-axis). Note that the call rate is very low at around 0% (that is, no change to the insurance premium). FIG. 13 is a display 1300 including a call volume by premium percentage change chart 1310 with bars 1320 showing the impact of various premium change percentages (the x-axis) on call volume (the y-axis). Note that the call volume peaks at around 0% (that is, no change to the insurance premium).

Figure 14:
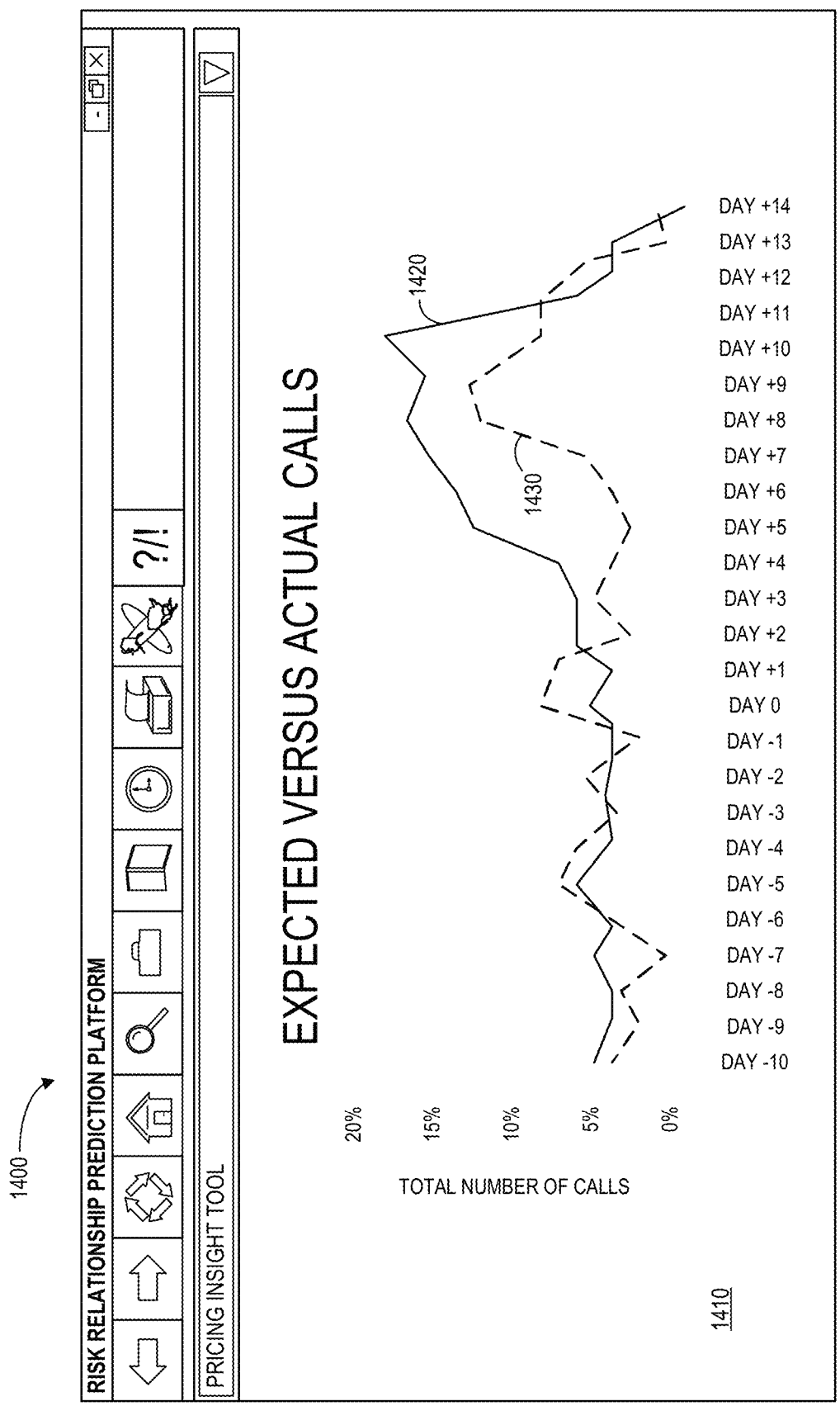
FIG. 14 is a call day prediction display according to some embodiments.

FIG. 14 is a call day prediction display 1400 according to some embodiments. The display 1400 might be associated with a model that predicts which day in a renewal window customers are most likely to place a telephone call to the insurance enterprise. The display indicates, on a day-by-day basis (the x-axis) both an expected total number of calls (solid line 1420) and an actual total number of calls (dashed line 1430). Such a display 1400 might include a graph 1410 to help an administrator allocate telephone call center resources to improve the performance of the system (e.g., by reducing wait times and customer frustration).

Figure 15:
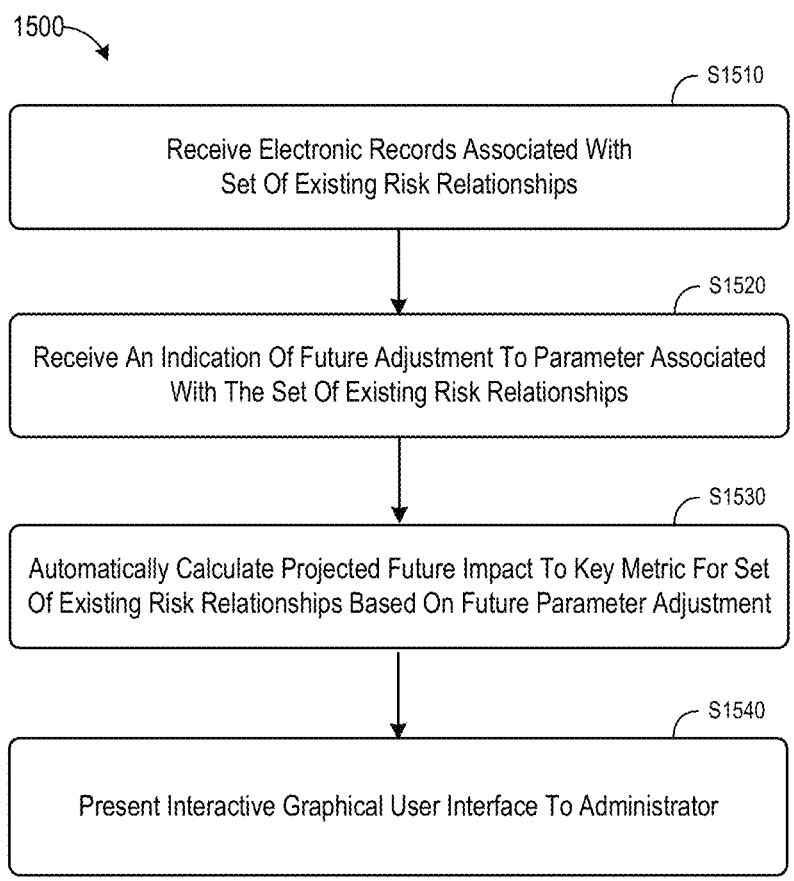
FIG. 15 illustrates a method that might be performed in accordance with some embodiments.

Note that the system 100 of FIG. 1 is provided only as an example, and embodiments may be associated with additional elements or components. According to some embodiments, the elements of the system 100 facilitate an exchange of information. FIG. 15 illustrates a method 1500 that might be performed by some or all of the elements of the system 100 described with respect to FIG. 1, or any other system, according to some embodiments of the present invention. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At S1510, a prediction platform (e.g., associated with a spreadsheet application and/or a web-based tool) may receive electronic records from an existing risk relationship data store, each electronic record including a risk relationship identifier and a risk relationship characteristic for an existing risk relationship between an insurance enterprise and an entity. At S1520, the prediction platform may receive an indication of a future adjustment to a parameter associated with the set of existing risk relationships (e.g., an insurance premium change). By ways of examples, the parameter being adjusted might be associated with an organization membership status, an organization membership year count, an account credit, advance quote days, an at fault accident count, a business insurance limit, a comparative rater indicator, a coverage package, a driver count, a home owner credit, etc.

At S1530, the prediction platform may automatically calculate a projected future impact to a key metric for the set of existing risk relationships (e.g., an issue rate, renewal rate, etc.) based on the future adjustment to the parameter. According to some embodiments, the automatically calculated projected future impact to the key metric is further based on geographic locations of the existing risk relationships (e.g., on a state-by-state basis). According to some embodiments, the existing risk relationships are insurance policies, and the key metric is associated with at least one of: (i) an issue rate, (ii) a new business loss ratio, (iii) a mix of business, (iv) a combined ratio, (v) policy retention, (vi) renewal call volume, (vii) underwriting income, (viii) an average quoted premium, (ix) an accepted policy count, (x) a retained count, (xi) a retained premium, (xii) a quote count, (xiii) issued policies, (xiv) an average issued premium, (xv) new business retention, (xvi) renewal retention, (xvii) a rated premium change, (xviii) an offered premium change, (xix) a total earned premium, and (xx) a net present value.

At S1540, a rendering platform may present an interactive graphical user interface (e.g., to an administrator of the insurance enterprise), including an indication of projected future impact, to an administrator. According to some embodiments, the interactive graphical user platform may display, for each of a plurality of years: (i) a currently projected key metric value, (ii) a proposed projected key metric value, and (iii) a percentage change between the currently projected key metric value and the proposed projected key metric value. The information provided by the graphical user interface might be used, for example, by an administrator to better understand potential outcomes caused by the future adjustment (that is, the results of the change).

Figure 16:
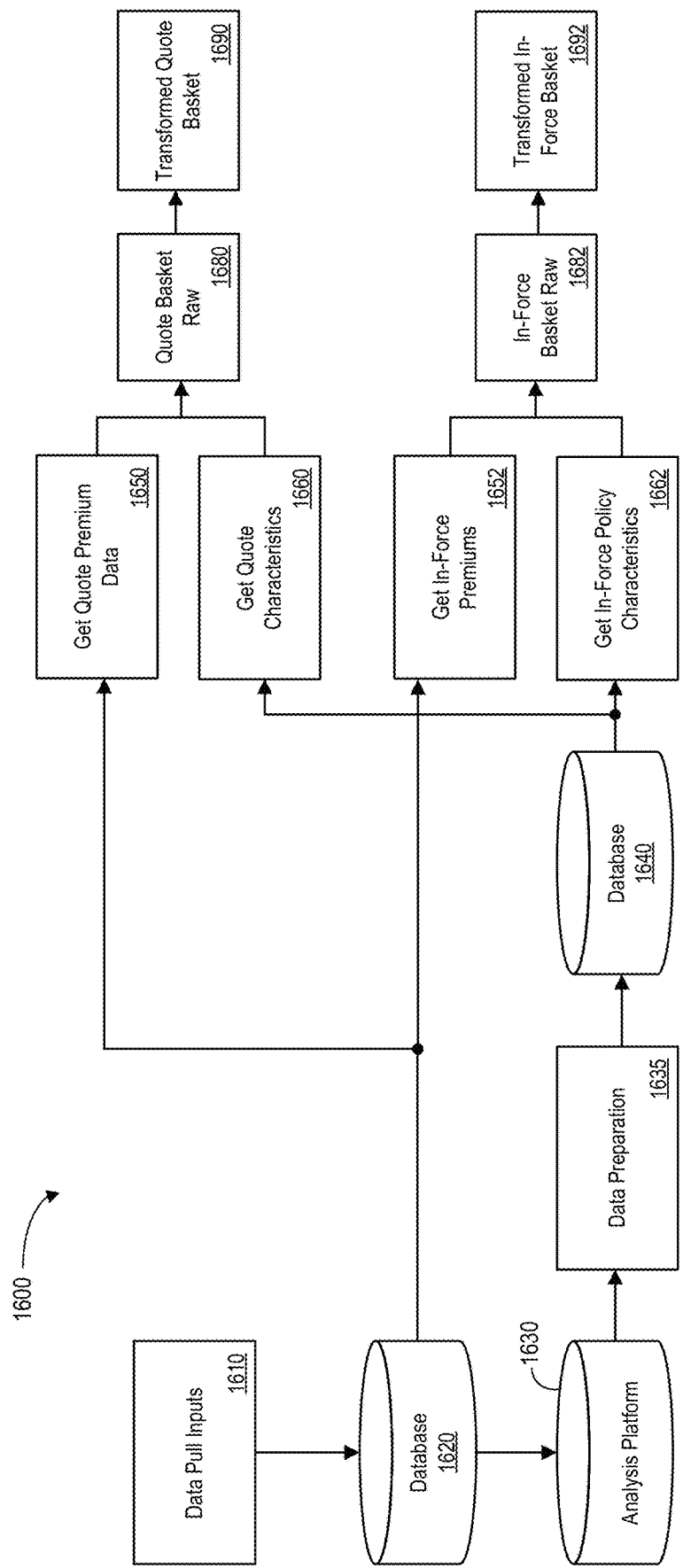
FIGS. 16 through 18 comprise a pricing insight process flow according to some embodiments.
Figure 17:
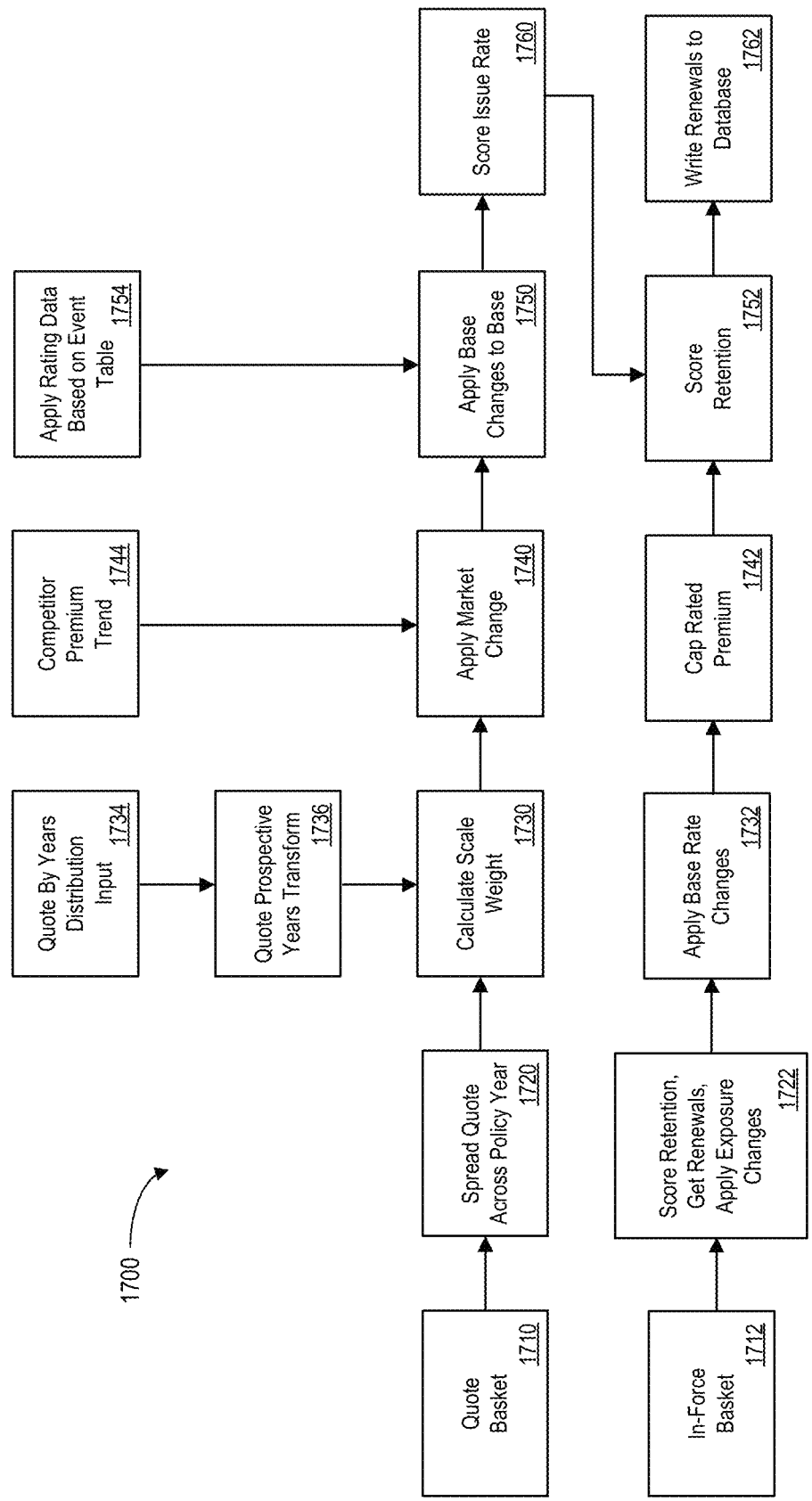
Figure 18:
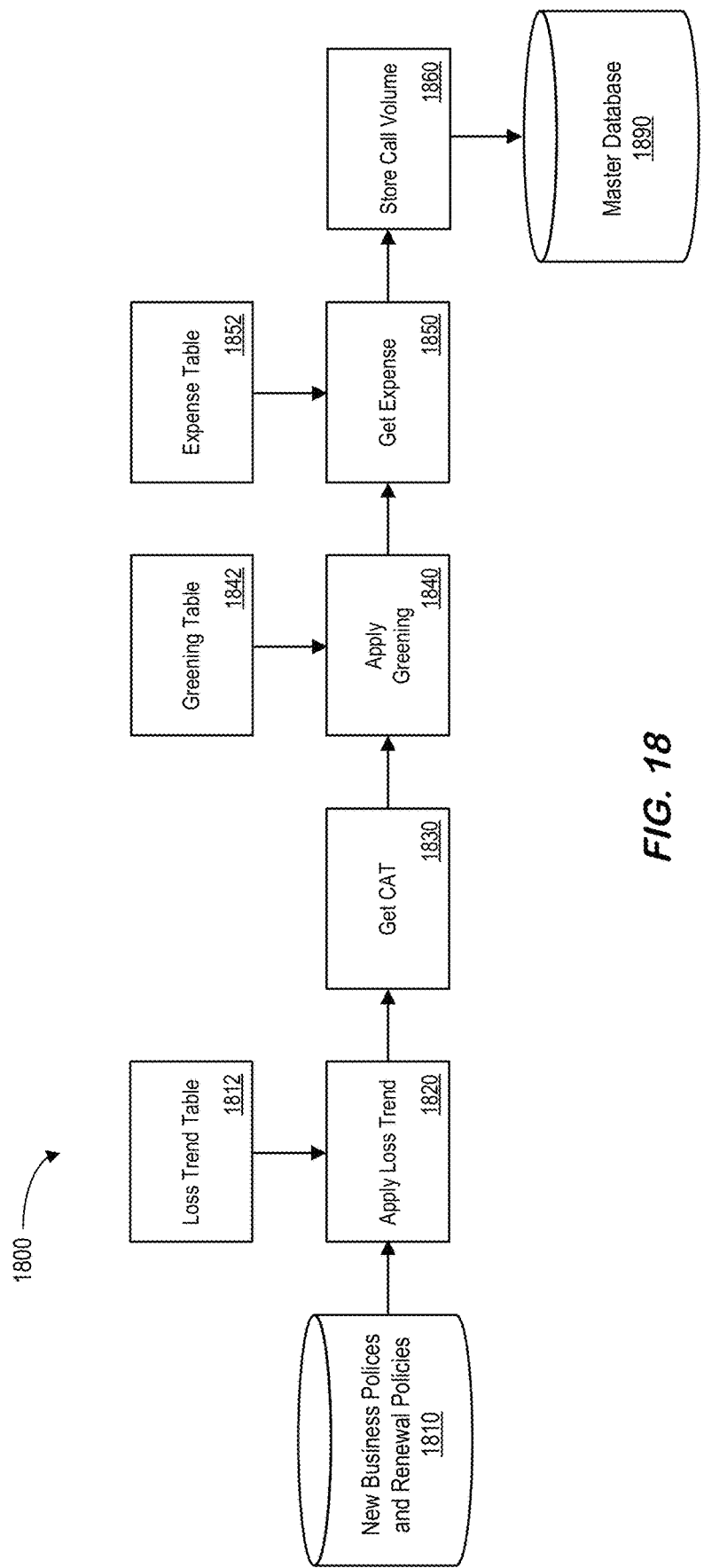

FIGS. 16 through 18 comprise a pricing insight process flow according to some embodiments. In particular, FIG. 16 illustrates a process 1600 wherein data pull inputs 1610 are provided to a database 1620, such as an ORACLE® database. Information from the database 1620 may then be provided to a get quote premium data element 1650 and a get in-force premiums 1652 element. Information from the database 1620 may also be output to a analytics platform 1630 to undergo a data preparation process 1635 (the results of which may be stored into another database 1640 and provided to a get quote characteristics elements 1660 and a get in-force policy characteristics elements 1662). Results from the get quote premium data 1650 element and the get quote characteristics element 1660 may be stored into a quote basket raw 1680 datastore, undergo a variable transform, and end up in a transformed quote basket 1690. Results from the get in-force premiums 1652 element and the get in-force policy characteristics element 1662 may be stored into an in-force basket raw 1682 datastore, undergo a variable transform, and end up in a transformed in-force basket 1692.

FIG. 17 illustrates a process 1700 wherein data from a quote basket 1710 (e.g., associated with the transformed quote basket 1690 of FIG. 16) is spread across a policy year 1720 and used to calculate a scale weight (and scale) 1730. The scale weight and scale may also be based on a quote by years distribution input 1734 after undergoing a quote prospective years transform 1736. The calculated scale weight 1730 may be provided to an apply market change function 1740 (e.g., to simulation years) that also considers a competitor premium trend 1744 user input. The output of the apply market change function 1740 may be provided to apply base changes to base function 1750 that may also receive information from an apply rating data based on an event table function 1754. The apply rating data based on the event table function 1754 might be created, according to some embodiments, using exposure factor, adjustment factor, and base rate user inputs after undergoing a factor transform. The apply rating data based on the event table function 1754 might also use a rate plan effective date and number of years to forecast to determine a semi-annual date for 6-month policies. Once the apply base changes to base 1750 is completed, the process 1700 may score the issue rate 1760.

The process 1700 may also provide data from the in-force basket 1712 (e.g., associated with the transformed in-force basket 1692 of FIG. 16) to score retention, get renewals, and/or apply exposure changes 1722. Base rate changes may then be applied 1732 and used by a cap rated premium function 1742 (e.g., after a capping table transform is applied to a capping table user input). A score retention function 1752 may use outputs from the cap rate premium function 1742 and the scored issue rate 1760 to write renewals into a database 1762.

FIG. 18 illustrates a process 1800 information from a new business policies and renewal policies database 1810 (e.g., associated with the information written by the process of FIG. 17) is used to apply a loss trend 1820 from a loss trend table 1812. The system may then get CAT 1830 and apply greening 1840 in accordance with a greening table 1842. Next, the process may get expenses 1850 based on an expense table 1852 and store call volume 1860 into master database 1890 for use by an administrator of an insurance enterprise.

Figure 19:
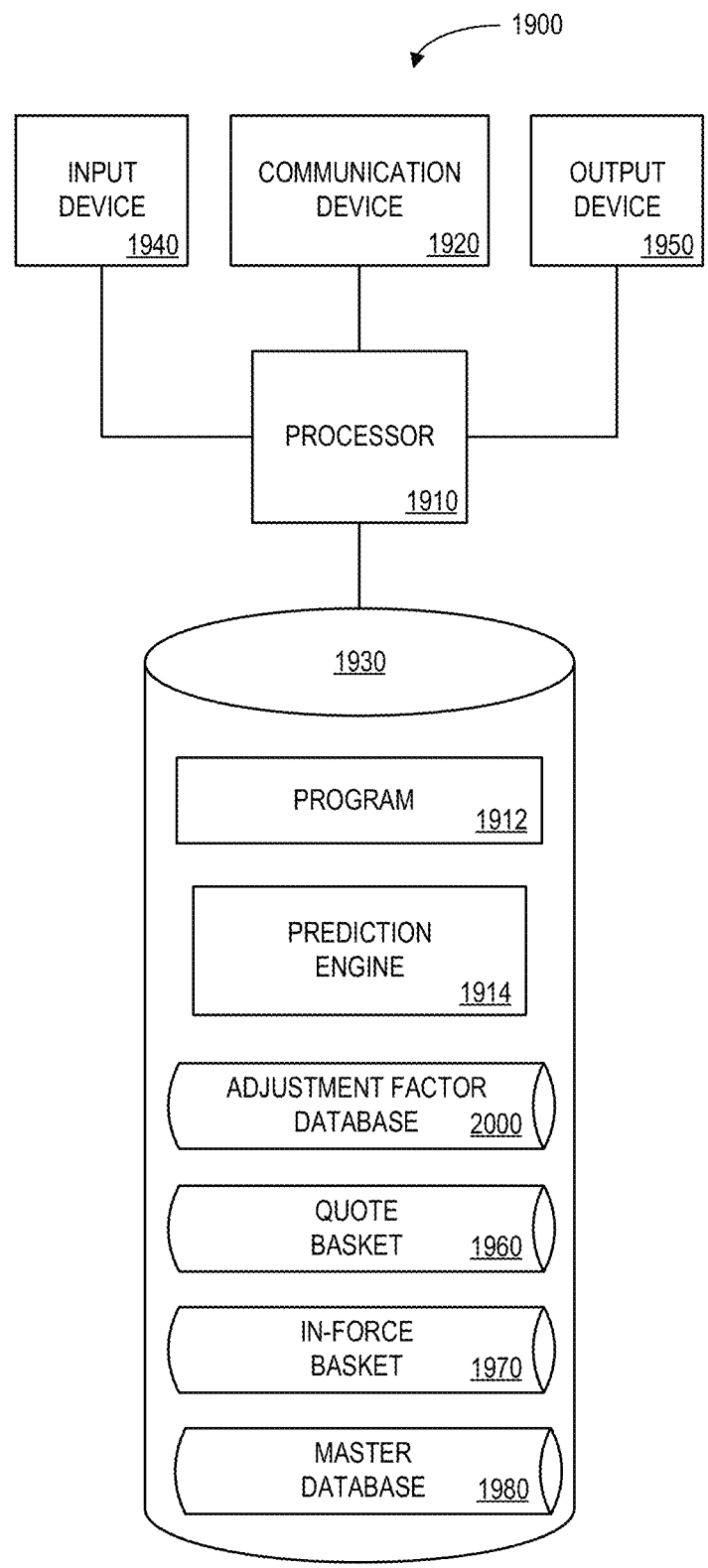
FIG. 19 is block diagram of a pricing insight tool or platform according to some embodiments of the present invention.

The embodiments described herein may be implemented using any number of different hardware configurations. For example, FIG. 19 illustrates a prediction platform 1900 that may be, for example, associated with the system 100 of FIG. 1. The prediction platform 1900 comprises a processor 1910, such as one or more commercially available Central Processing Units (CPUs) in the form of one-chip microprocessors, coupled to a communication device 1920 configured to communicate via a communication network (not shown in FIG. 19). The communication device 1920 may be used to communicate, for example, with one or more remote data stores, administrator devices, etc. Note that communications exchanged via the communication device 1920 may utilize security features, such as those between a public internet user and an internal network of the insurance enterprise. The security features might be associated with, for example, web servers, firewalls, and/or PCI infrastructure. The prediction platform 1900 further includes an input device 1940 (e.g., a mouse and/or keyboard to enter information about insurance rate changes) and an output device 1950 (e.g., to output dashboards or reports regarding system administration, projected key metric values, recommendations, insurance policy premiums, etc.).

The processor 1910 also communicates with a storage device 1930. The storage device 1930 may comprise any appropriate information storage device, including combinations of magnetic storage devices (e.g., a hard disk drive), optical storage devices, mobile telephones, and/or semiconductor memory devices. The storage device 1930 stores a program 1912 and/or a prediction engine or application 1914 for controlling the processor 1910. The processor 1910 performs instructions of the programs 1912, 1914, and thereby operates in accordance with any of the embodiments described herein. For example, the processor 1910 may receive electronic records associated with a set of existing risk relationships along with an indication of a future adjustment to a parameter associated with the set of existing risk relationships. The processor 1910 may then automatically calculate a projected future impact to a key metric for the set of existing risk relationships based on the future adjustment to the parameter. A rendering platform may receive the projected future impact to the key metric and present an interactive graphical user interface, including an indication of projected future impact, to an administrator.

The programs 1912, 1914 may be stored in a compressed, uncompiled and/or encrypted format. The programs 1912, 1914 may furthermore include other program elements, such as an operating system, a database management system, and/or device drivers used by the processor 1910 to interface with peripheral devices.

As used herein, information may be "received" by or "transmitted" to, for example: (i) the prediction platform 1900 from another device; or (ii) a software application or module within the prediction platform 1910 from another software application, module, or any other source.

In some embodiments (such as shown in FIG. 19), the storage device 1930 includes an adjustment factor database 2000, a quote based 1960 (e.g., storing information new business), an in-force basket 1970 (e.g., storing information about existing policies), and master database 1980 (e.g., storing information about projected key metric values). An example of a database that may be used in connection with the prediction platform 1900 will now be described in detail with respect to FIG. 20. Note that the database described herein is only an example, and additional and/or different information may be stored therein. Moreover, various databases might be split or combined in accordance with any of the embodiments described herein. For example, the master database 1980 and/or adjustment factor database 2000 might be combined and/or linked to each other within the prediction engine 1914.

Figure 20:
FIG. 20 is a tabular portion of an adjustment factor database according to some embodiments.

Referring to FIG. 20, a table is shown that represents the adjustment factor database 2000 that may be stored at the prediction platform 1900 according to some embodiments. The table may include, for example, entries identifying factors that may be adjusted by an administrator. The table may also define fields 2002, 2004, 2006, 2008, 2010, 2012 for each of the entries. The fields 2002, 2004, 2006, 2008, 2010, 2012 may, according to some embodiments, specify: a ZIP code 2002, a county 2004 and group 2006, a first factor 2008, a second factor 2010, and a third factor 2012. The adjustment factor database 2000 may be periodically created and updated, for example, based on information electrically and/or graphically input from a user or application.

The ZIP code 2002, county 2004, and group 2006 may be, for example, unique alphanumeric codes identifying a particular geographic location (e.g., the Arlington, Va. and District of Columbia area). The factors 2008, 2010, 2012 might comprise adjustment factors that can be changed via user input. Other examples of adjustment factors might include PIP, UM, organization membership status, year count, average mileage, a driver count, a home owner credit, etc.

Figure 21:
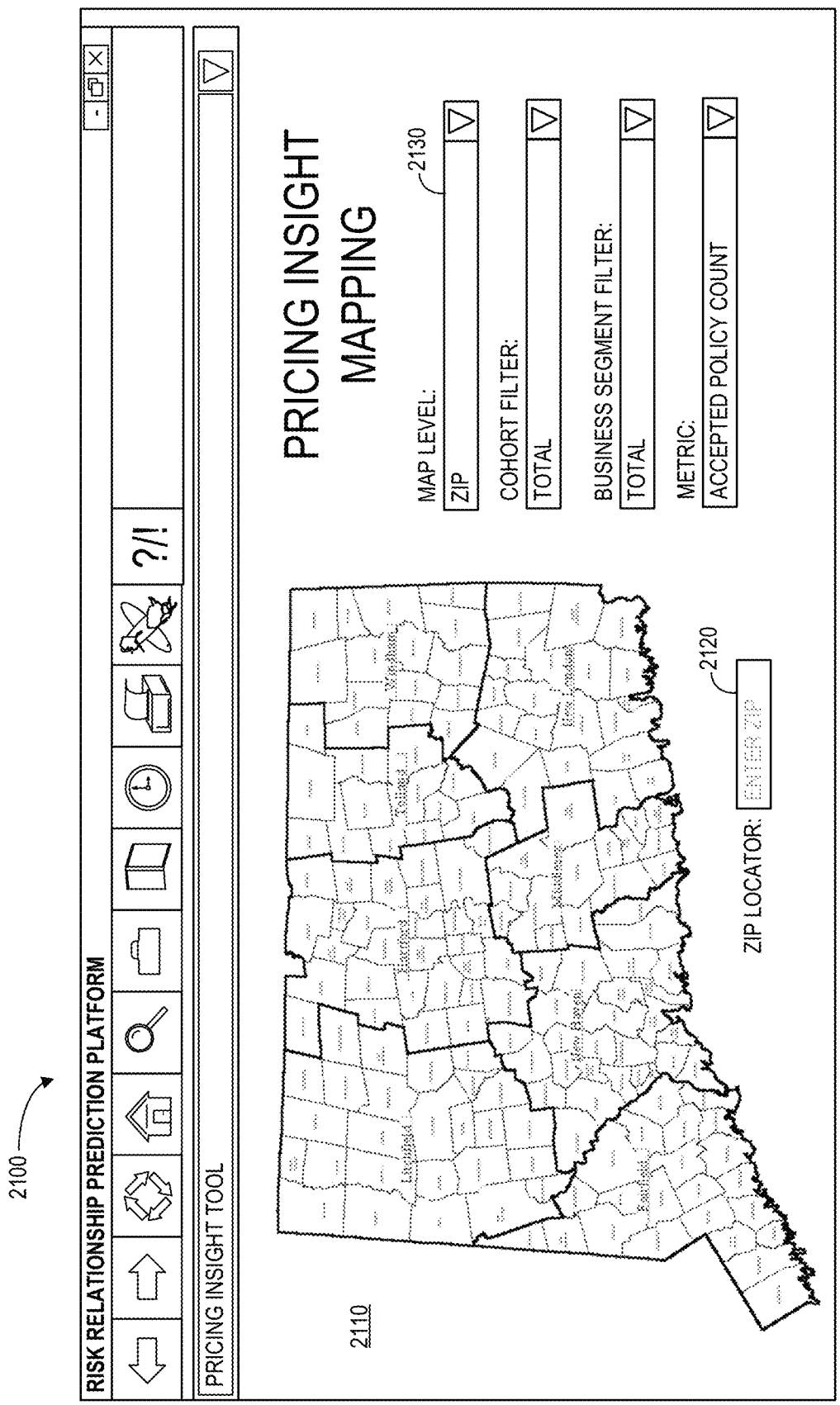
FIG. 21 is a pricing insight mapping display in accordance with some embodiments.

FIG. 21 is a pricing insight mapping display 2100 in accordance with some embodiments. The display 2100 includes a map portion 2110 that displays projected future impacts to one or more key metrics in accordance with any of the embodiments described herein. According to some embodiments, the display 2100 include is a ZIP code locator search box 2120 that an administrator can use to adjust the map portion 2110. Moreover, one or more user-selectable filters 2130 may be provided to further adjust the displayed information. Examples of such filters 2130 include a policy year versus rating year selection, a map level (e.g., ZIP code level, county level, state level, etc.), a cohort filter, a business segment filter, a selected metric, a selected year, etc.

Figure 22:
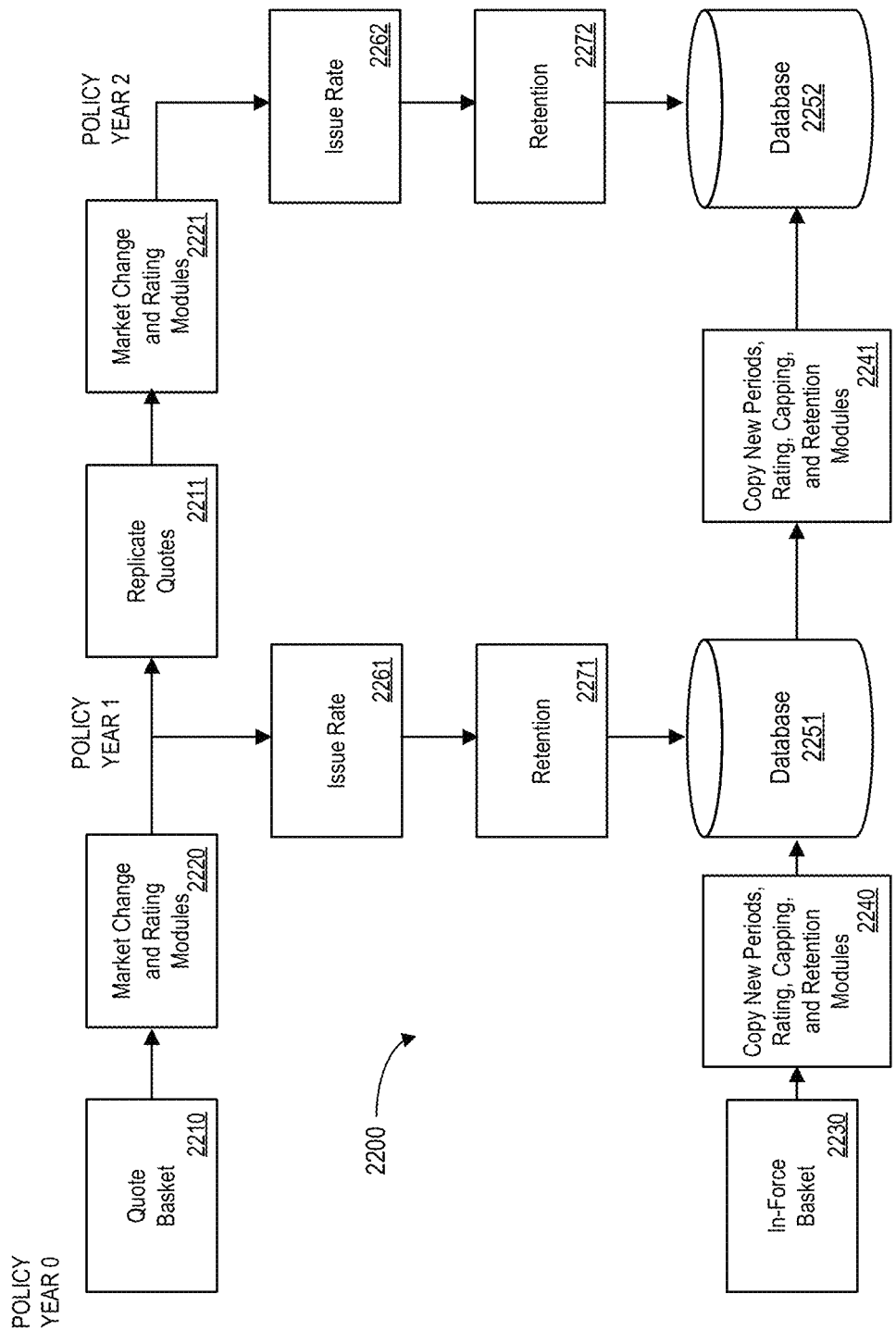
FIG. 22 is a multi-year pricing insight process associated with insurance policy retention according to some embodiments.

FIG. 22 is a multi-year pricing insight process 2200 associated with insurance policy retention according to some embodiments. The process 2200 begins at policy year 0 where information from a quote basket 2210 (e.g., associated with the transformed quote basket 1690 of FIG. 16) is processed by market change and rating modules 2220 to create policy year 1 quote data. The process 2200 may also provide data from an in-force basket 2230 (e.g., associated with the transformed in-force basket 1692 of FIG. 16) that undergoes a copy new period function (e.g., to get renewals, exposure change, and write to database), routing module, capping module, and retention module 2240 to create policy year 1 in-force data stored into a database 2251. The database 2251 may also store the policy year 1 quote data after it is processed by an issue rate module 2261 and a retention module 2271. The policy year 1 quote data is processed by a replicate quotes module 2211 and market change and rating modules 2221 to create policy year 2 quote data. Data from the database 2251 associated with policy year 1 in-force information undergoes a copy new period function (e.g., to get renewals, exposure change, and write to database), routing module, capping module, and retention module 2241 to create policy year 2 in-force data stored into a database 2252. The database 2252 may also store the policy year 2 quote data after it is processed by an issue rate module 2262 and a retention module 2272.

Figure 23:
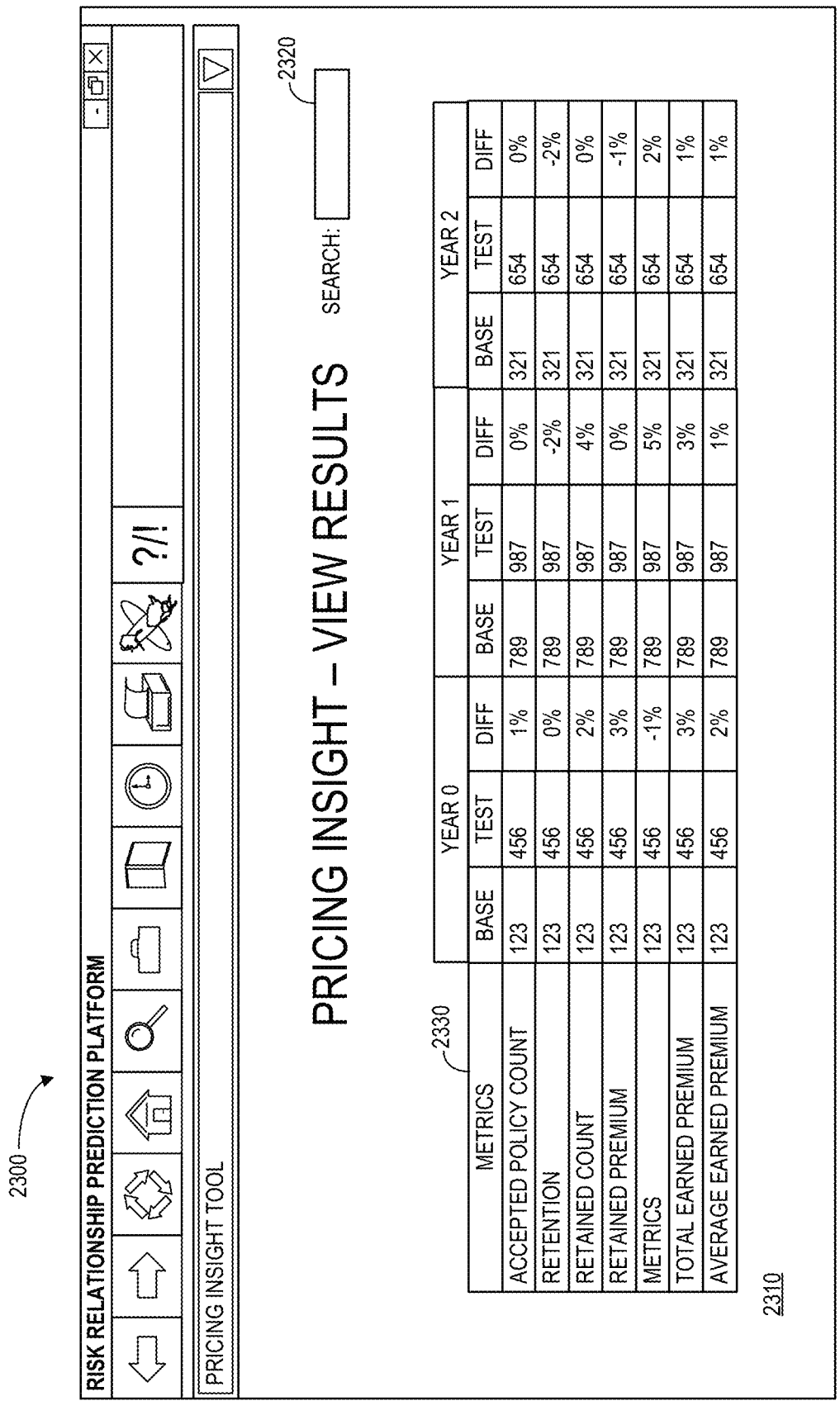
FIG. 23 is a multi-year pricing insight results display associated with insurance policy retention according to some embodiments.

FIG. 23 is a multi-year pricing insight results display 2300 associated with insurance policy retention according to some embodiments. The display 2300 includes a tabular presentation of results for years 0, 1 and 2 including a base value, a test value, and a percentage difference between the base value the test value for various metrics 2330. According to some embodiments, the display 2300 may be adjusted to display policy year data or rating year data, incorporate a search box 2320 to help an administrator locate relevant information, and may support downloading the results for use by another application (e.g., in HTML format). Examples of metrics 2330 might include accepted policy count, retention, retained count, retained premium, total earned premium, average earned premium, average earned loss, loss ratio, etc.

Figure 24:
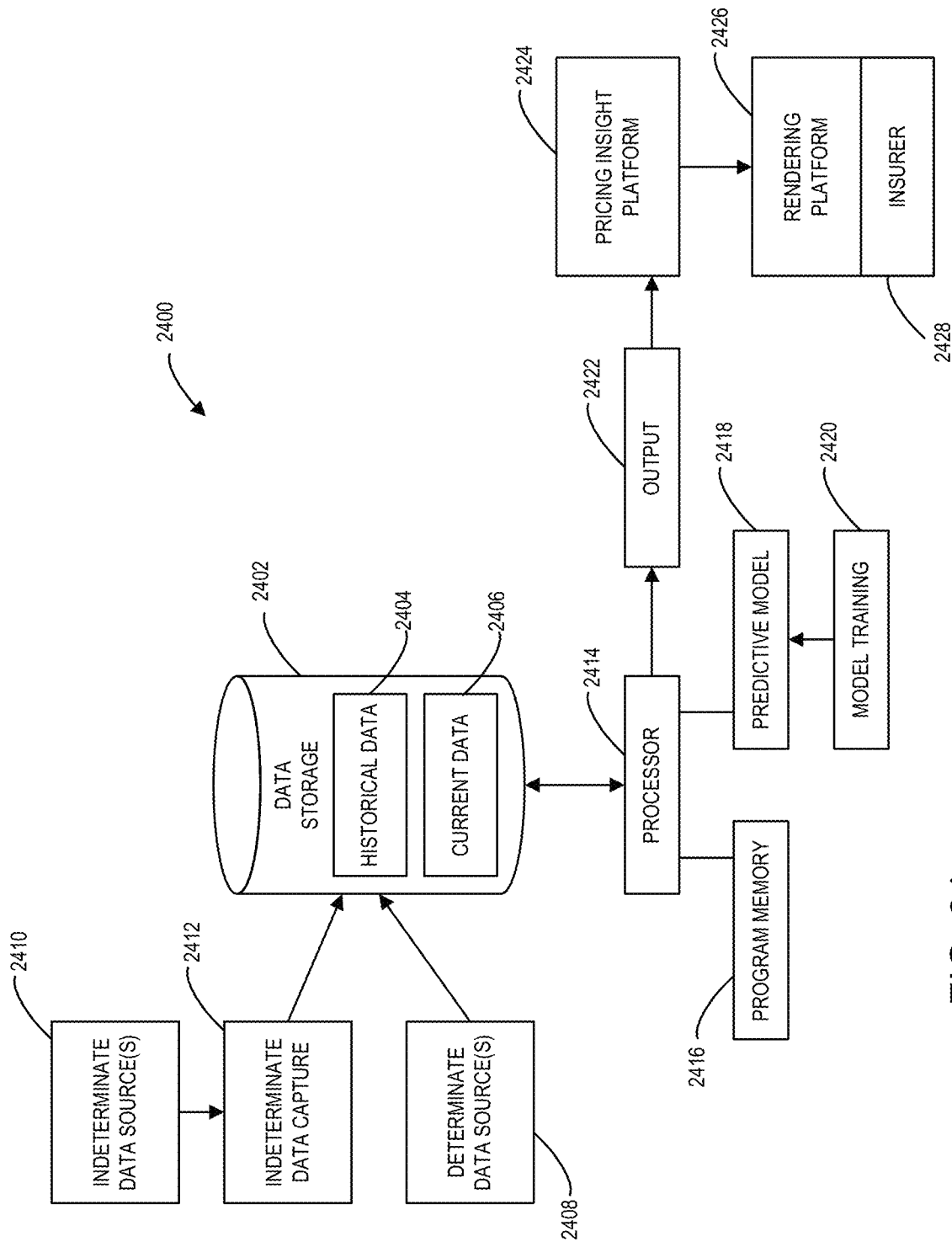
FIG. 24 illustrates a system associated with a predictive model according to some embodiments.

According to some embodiments, one or more predictive models may be used to generate models or help underwrite insurance policies and/or predict impacts to key metrics based on prior events or insurance claims. Although some aspects of FIG. 24 will be described with respect to analysis of insurance claims, note that embodiments might similarly analyze other types of insurance information (e.g., renew patterns, telephone call behavior, etc.). Features of some embodiments associated with a predictive model will now be described by first referring to FIG. 24. FIG. 24 is a partially functional block diagram that illustrates aspects of a computer system 2400 provided in accordance with some embodiments of the invention. For present purposes, it will be assumed that the computer system 2400 is operated by an insurance company (not separately shown) to support pricing insight evaluation and processing.

The computer system 2400 includes a data storage module 2402. In terms of its hardware the data storage module 2402 may be conventional, and may be composed, for example, by one or more magnetic hard disk drives. A function performed by the data storage module 2402 in the computer system 2400 is to receive, store and provide access to both historical claim transaction data (reference numeral 2404) and current claim transaction data (reference numeral 2406). As described in more detail below, the historical claim transaction data 2404 is employed to train a predictive model to provide an output that indicates projected future impacts, and the current claim transaction data 2406 may thereafter analyzed by the predictive model. Moreover, as time goes by, and results become known from processing current claim transactions, at least some of the current claim transactions may be used to perform further training of the predictive model. Consequently, the predictive model may thereby adapt itself to changing event impacts and damage amounts.

Either the historical claim transaction data 2404 or the current claim transaction data 2406 might include, according to some embodiments, determinate and indeterminate data. As used herein and in the appended claims, "determinate data" refers to verifiable facts such as the age of a building; a building type; an event type (e.g., a burst pipe or flood); a date of loss, or date of report of claim, or policy date or other date; a time of day; a day of the week; a geographic location, address or ZIP code; and a policy number.

As used herein, "indeterminate data" refers to data or other information that is not in a predetermined format and/or location in a data record or data form. Examples of indeterminate data include narrative speech or text, information in descriptive notes fields and signal characteristics in audible voice data files. Indeterminate data extracted from medical notes or accident reports might be associated with, for example, an amount of loss and/or details about damages.

The determinate data may come from one or more determinate data sources 2408 that are included in the computer system 2400 and are coupled to the data storage module 2402. The determinate data may include "hard" data like a claimant's name, tax identifier umber, policy number, address; the date of loss; the date the claim was reported, etc. One possible source of the determinate data may be the insurance company's policy database (not separately indicated). Another possible source of determinate data may be from data entry by the insurance company's claims intake administrative personnel.

The indeterminate data may originate from one or more indeterminate data sources 2410, and may be extracted from raw files or the like by one or more indeterminate data capture modules 2412. Both the indeterminate data source(s) 2410 and the indeterminate data capture module(s) 2412 may be included in the computer system 2400 and coupled directly or indirectly to the data storage module 2402. Examples of the indeterminate data source(s) 2410 may include data storage facilities for document images, for text files (e.g., claim handlers' notes) and digitized recorded voice files (e.g., claimants' oral statements, witness interviews, claim handlers' oral notes, etc.). Examples of the indeterminate data capture module(s) 2412 may include one or more optical character readers, a speech recognition device (i.e., speech-to-text conversion), a computer or computers programmed to perform natural language processing, a computer or computers programmed to identify and extract information from narrative text files, a computer or computers programmed to detect key words in text files, and a computer or computers programmed to detect indeterminate data regarding an individual. For example, claim handlers' opinions may be extracted from their narrative text file notes.

The computer system 2400 also may include a computer processor 2414. The computer processor 2414 may include one or more conventional microprocessors and may operate to execute programmed instructions to provide functionality as described herein. Among other functions, the computer processor 2414 may store and retrieve historical claim transaction data 2404 and current claim transaction data 2406 in and from the data storage module 2402. Thus, the computer processor 2414 may be coupled to the data storage module 2402.

The computer system 2400 may further include a program memory 2416 that is coupled to the computer processor 2414. The program memory 2416 may include one or more fixed storage devices, such as one or more hard disk drives, and one or more volatile storage devices, such as RAM devices. The program memory 2416 may be at least partially integrated with the data storage module 2402. The program memory 2416 may store one or more application programs, an operating system, device drivers, etc., all of which may contain program instruction steps for execution by the computer processor 2414.

The computer system 2400 further includes a predictive model component 2418. In certain practical embodiments of the computer system 2400, the predictive model component 2418 may effectively be implemented via the computer processor 2414, one or more application programs stored in the program memory 2416, and data stored as a result of training operations based on the historical claim transaction data 2404 (and possibly also data received from a third-party reporting service). In some embodiments, data arising from model training may be stored in the data storage module 2402, or in a separate data store (not separately shown). A function of the predictive model component 2418 may be to determine appropriate simulation models, results, and/or scores (e.g., a rating indicating how many callers are likely to place telephone calls to a call center). The predictive model component may be directly or indirectly coupled to the data storage module 2402.

The predictive model component 2418 may operate generally in accordance with conventional principles for predictive models, except, as noted herein, for at least some of the types of data to which the predictive model component is applied. Those who are skilled in the art are generally familiar with programming of predictive models. It is within the abilities of those who are skilled in the art, if guided by the teachings of this disclosure, to program a predictive model to operate as described herein.

Still further, the computer system 2400 includes a model training component 2420. The model training component 2420 may be coupled to the computer processor 2414 (directly or indirectly) and may have the function of training the predictive model component 2418 based on the historical claim transaction data 2404 and/or information about policy renewal events, incidents, and alerts. (As will be understood from previous discussion, the model training component 2420 may further train the predictive model component 2418 as further relevant data becomes available.) The model training component 2420 may be embodied at least in part by the computer processor 2414 and one or more application programs stored in the program memory 2416. Thus, the training of the predictive model component 2418 by the model training component 2420 may occur in accordance with program instructions stored in the program memory 2416 and executed by the computer processor 2414.

In addition, the computer system 2400 may include an output device 2422. The output device 2422 may be coupled to the computer processor 2414. A function of the output device 2422 may be to provide an output that is indicative of (as determined by the trained predictive model component 2418) project future key metric values, insurance underwriting parameters, and recommendations. The output may be generated by the computer processor 2414 in accordance with program instructions stored in the program memory 2416 and executed by the computer processor 2414. More specifically, the output may be generated by the computer processor 2414 in response to applying the data for the current simulation to the trained predictive model component 2418. The output may, for example, be a monetary estimate, a predicted number of telephone calls, and/or likelihood within a predetermined range of numbers. In some embodiments, the output device may be implemented by a suitable program or program module executed by the computer processor 2414 in response to operation of the predictive model component 2418.

Still further, the computer system 2400 may include a pricing insight platform 2424. The pricing insight platform 2424 may be implemented in some embodiments by a software module executed by the computer processor 2414. The pricing insight platform 2424 may have the function of rendering a portion of the display on the output device 2422. Thus, the pricing insight platform 2424 may be coupled, at least functionally, to the output device 2422. In some embodiments, for example, the pricing insight platform 2424 may direct workflow by referring, to a rendering platform 2426, predicted future key metric values, recommendations, underwriting parameters, and/or alerts generated by the predictive model component 2418 and found to be associated with various results or scores. In some embodiments, this data may be provided to an insurer 2428 who may modify insurance parameters or decisions as appropriate. In this way, the computer system 2400 may be used to create one or more analytic models to help project future impacts to key metric values in accordance with any of the embodiments described herein.

Thus, embodiments may provide an automated and efficient way to facilitate pricing insights and understanding associated with risk relationships. The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Although specific hardware and data configurations have been described herein, note that any number of other configurations may be provided in accordance with embodiments of the present invention (e.g., some of the information associated with projected future metrics might be implemented as an augmented reality display and/or the databases described herein may be combined or stored in external systems). Moreover, although embodiments have been described with respect to particular performance metrics, embodiments may instead be associated with other types of risk relationship information. For example, embodiments might be used in connection with predicted losses due to fraud, flood damage patterns, motor vehicle accent rates, etc.

Figure 25:
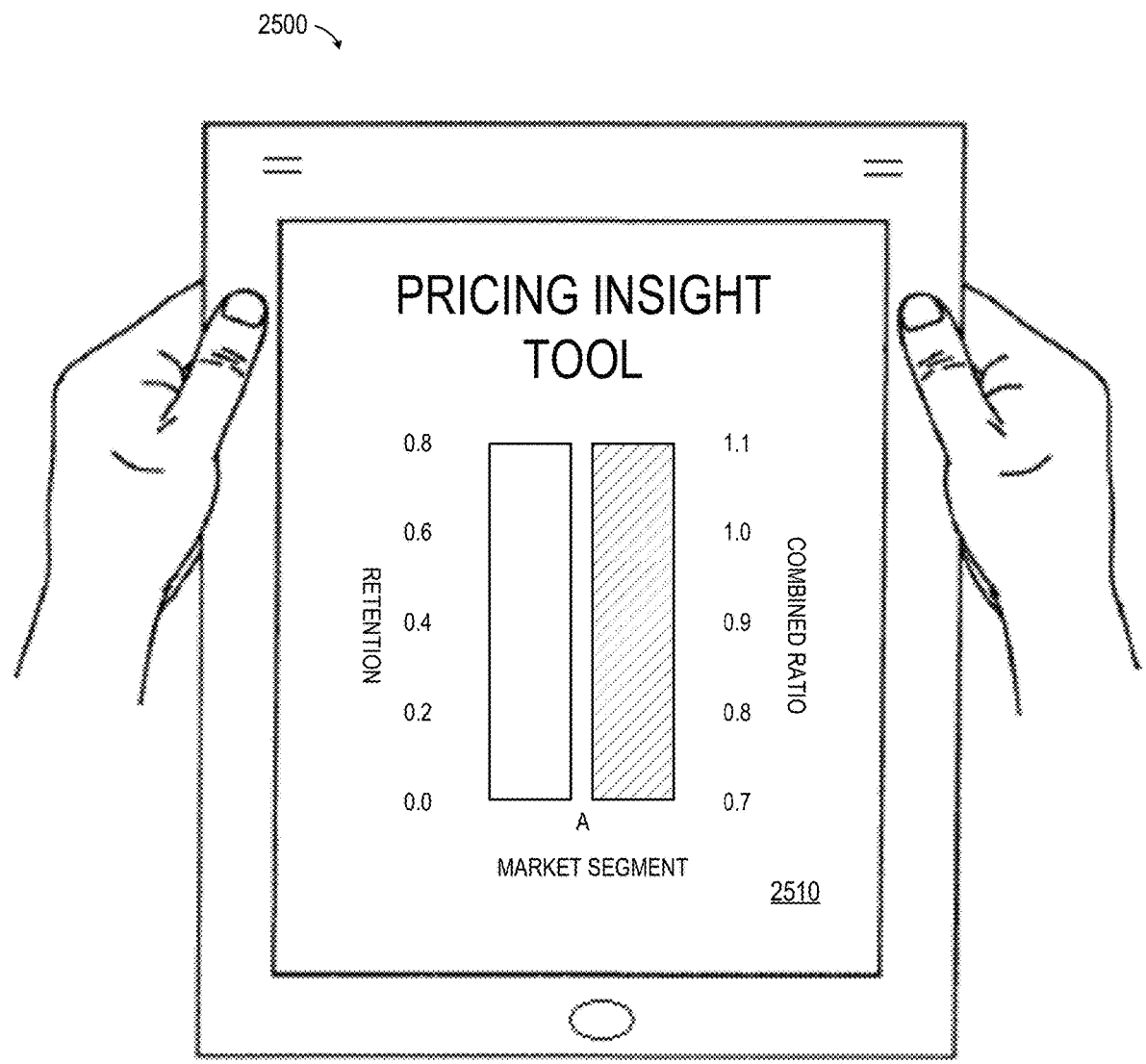
FIG. 25 illustrates an interactive operator display on a portable device in accordance with some embodiments.

Moreover, enhancements to a pricing insight tool might include an increased limit factor tool, a capping tool, a territory decision support tool, etc. Moreover, embodiments might expand file output to include more reporting, automatically create filing forms, automatically create particular types of packs, improve the quality of reports with third-party data, and/or integrate with other functional areas (e.g., marketing, operations, actuarial functions, etc.). Still further, the displays and devices illustrated herein are only provided as examples, and embodiments may be associated with any other types of user interfaces. For example, FIG. 25 illustrates a handheld pricing insight tool display 2500 according to some embodiments. According to some embodiments, elements of the display 2510 are selectable (e.g., via a touchscreen) to adjust and/or see more information about that particular element.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed is:

1. A system associated with an insurer, comprising:
   an existing insurance policy data store containing electronic records, each electronic record including an insurance policy identifier and a risk relationship characteristic for an existing insurance policy between the insurer and an insured;
   a prediction platform, coupled to the existing insurance policy data store, including:
      computer processor, and
      a computer memory coupled to the computer processor and storing instructions that, when executed by the computer processor, cause the prediction platform to:
         train a predictive model using data records of historical claim transactions and information about policy renewal events, incidents and alerts,
         train the predictive model with some current claims data such that the predictive model adapts itself to changing event impacts and damage amounts,
         use feedback to improve performance of the predictive model,
         receive electronic records associated with a set of existing insurance policies,
         receive an indication of a future premium change associated with the set of existing insurance policies,
         automatically calculate a projected future impact to an issue rate for the set of existing insurance policies based on the future premium change,
         automatically calculate a projected future impact to telephone call volume based on the future premium change to help allocate telephone call center resources and improve the performance of the system, and
         generate and transmit a graph reflecting predicted telephone call center volume following the future premium change; and
   a rendering platform, coupled to the prediction platform, to receive the projected future impact to the issue rate and present an interactive graphical user interface, including an indication of projected future impact, to an administrator, wherein the user interface graphically displays: (i) a quote count, (ii) a pre-actual marker, (iii) a post-actual marker, and (iv) a post-estimate marker, wherein the rending platform receives user-selectable filter information, including a map level filter and a cohort filter, and transmits information in accordance with the filter information to present the interactive graphical user interface without transmitting information not in accordance with the filter information, thereby reducing a number of electronic messages that are transmitted and improving operation of the system.

2. The system of claim 1, wherein the automatically calculated projected future impact to the issue rate is further based on geographic locations of the existing insurance policies.

3. The system of claim 1, wherein the prediction platform is associated with at least one of: (i) a spreadsheet application, and (ii) a web-based tool.

4. The system of claim 1, wherein the interactive graphical user interface displays, for each of a plurality of years: (i) a currently projected issue rate value, (ii) a proposed projected issue rate value, and (iii) a percentage change between the currently projected issue rate value and the proposed projected issue rate value.

5. The system of claim 1, wherein the user interface displays insurance policy renewal telephone call values and insurance policy non-renewal telephone call values.

6. The system of claim 1, wherein the user interface displays telephone call rates associated with a range of insurance premium changes.

7. The system of claim 1, wherein the user interface displays a total call volume associated with a range of insurance policy dates.

8. The system of claim 1, wherein the prediction platform further receives an indication of a future adjustment to at least one of: (i) organization membership status, (ii) an organization membership year count, (iii) an account credit, (iv) advance quote days, (v) an at fault accident count, (vi) a business insurance limit, (vii) a comparative rater indicator, (viii) a coverage package, (ix) a driver count, and (x) a home owner credit.

9. The system of claim 1, wherein the user interface displays a mapping image of the projected future impact to the issue rate.

10. A computerized method associated with a system operated by an insurer, comprising:
   training a predictive model using data records of historical claim transactions and information about policy renewal events, incidents and alerts,
   training the predictive model with some current claims data such that the predictive model adapts itself to changing event impacts and damage amounts;
   using feedback to improve performance of the predictive model;
   receiving, at a computer processor of prediction platform from an existing insurance policy data store, electronic records, each electronic record including an insurance policy identifier and a risk relationship characteristic for an existing insurance policy between the insurer and an insured, said electronic records associated with a set of existing insurance policies;
   receiving an indication of a future premium change associated with the set of existing insurance policies;
   automatically calculating a projected future impact to an issue rate for the set of existing insurance policies based on the future premium change;
   automatically calculating a projected future impact to telephone call center volume based on the future premium change to help allocate telephone call center resources and improve performance of the system;

presenting, by a rendering platform, an interactive graphical user interface, including an indication of projected future impact, to an administrator, wherein the user interface graphically displays: (i) a quote count, (ii) a pre-actual marker, (iii) a post-actual marker, and (iv) a post-estimate marker, wherein the rending platform receives user-selectable filter information, including a map level filter and a cohort filter, and transmits information in accordance with the filter information to present the interactive graphical user interface without transmitting information not in accordance with the filter information, thereby reducing a number of electronic messages that are transmitted and improving operation of the system; and generating and transmitting a graph reflecting predicted telephone call center volume following the future premium change.

11. The method of claim 10, wherein the automatically calculated projected future impact to the issue rate is further based on geographic locations of the existing insurance policies.

12. The method of claim 10, wherein the prediction platform is associated with at least one of: (i) a spreadsheet application, and (ii) a web-based tool.

13. The method of claim 10, wherein the interactive graphical user interface displays, for each of a plurality of years: (i) a currently projected issue rate value, (ii) a proposed projected issue rate value, and (iii) a percentage change between the currently projected issue rate value and the proposed projected issue rate value.

* * * * *